United States Patent
Brock et al.

(10) Patent No.: US 11,915,212 B2
(45) Date of Patent: Feb. 27, 2024

(54) PAYMENT NETWORK FOR SECURITY ASSETS

(71) Applicant: Block, Inc., Oakland, CA (US)

(72) Inventors: Christopher Michael Brock, Berkeley, CA (US); Brian Grassadonia, San Francisco, CA (US); Michael Moring, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/052,621

(22) Filed: Nov. 4, 2022

(65) Prior Publication Data
US 2023/0115953 A1    Apr. 13, 2023

Related U.S. Application Data

(63) Continuation of application No. 17/513,648, filed on Oct. 28, 2021, which is a continuation of application
(Continued)

(51) Int. Cl.
*G06Q 40/04* (2012.01)
*G06Q 20/06* (2012.01)
(Continued)

(52) U.S. Cl.
CPC ........... *G06Q 20/065* (2013.01); *G06Q 20/20* (2013.01); *G06Q 20/3674* (2013.01); *G06Q 20/4012* (2013.01); *G06Q 40/04* (2013.01)

(58) Field of Classification Search
None
See application file for complete search history.

(56) References Cited

U.S. PATENT DOCUMENTS

| 7,110,971 | B2 | 9/2006 | Wallman |
| 7,707,093 | B2 | 4/2010 | O'Shaughnessy et al. |

(Continued)

FOREIGN PATENT DOCUMENTS

| EP | 2 953 076 A1 | 12/2015 |
| EP | 4020358 A1 | 6/2022 |

(Continued)

OTHER PUBLICATIONS

Eskandari S., et al.,"Buy Your Coffee With Bitcoin: Real-world Deployment of a Bitcoin Point of Sale Terminal" DOI: 10.1109/UIC-ATC-ScalCom-CBDCom-IoP-SmartWorld.2016.166, pp. 382-389 (Year: 2016).

(Continued)

*Primary Examiner* — Bruce I Ebersman
*Assistant Examiner* — Matthew Cobb
(74) *Attorney, Agent, or Firm* — Polsinelli PC

(57) ABSTRACT

In one embodiment, a securities transaction system includes a ledger storing securities balances of security assets managed by a payment service and owned by users of the payment service. The securities balances relate to securities purchased on from a securities exchange system. The securities transaction system includes processors for executing instructions executable to send, to a mobile wallet application associated with the payment service, information regarding one or more of the security assets managed by the payment service; receive, from the mobile wallet application, a purchase request to acquire an amount of one of the security assets; update, via the ledger, the securities balances to reflect amounts of security assets respectively managed by the payment service and owned by the user based on the purchase request; and initiate one or more transactions from the securities exchange system to maintain a specified level of the security asset.

20 Claims, 14 Drawing Sheets

Related U.S. Application Data

No. 16/147,501, filed on Sep. 28, 2018, now Pat. No. 11,263,603, which is a continuation-in-part of application No. 16/011,556, filed on Jun. 18, 2018, now Pat. No. 10,163,079, which is a continuation of application No. 15/713,322, filed on Sep. 22, 2017, now Pat. No. 10,055,715.

(60) Provisional application No. 62/715,780, filed on Aug. 7, 2018, provisional application No. 62/537,395, filed on Jul. 26, 2017.

(51) Int. Cl.
  *G06Q 20/40* (2012.01)
  *G06Q 20/36* (2012.01)
  *G06Q 20/20* (2012.01)

(56) References Cited

U.S. PATENT DOCUMENTS

| | | | |
|---|---|---|---|
| RE44,502 E | 9/2013 | Boesch et al. | |
| 8,751,359 B2* | 6/2014 | Walia | G06Q 40/06 705/36 R |
| 10,055,715 B1 | 8/2018 | Grassadonia et al. | |
| 10,108,938 B1 | 10/2018 | Brock et al. | |
| 10,163,079 B1 | 12/2018 | Brock et al. | |
| 10,621,561 B1 | 4/2020 | Brock et al. | |
| 10,817,853 B1 | 10/2020 | Brock et al. | |
| 10,885,578 B2 | 1/2021 | Frattalone | |
| 11,164,254 B1* | 11/2021 | Gordon, III | G06Q 20/0658 |
| 11,263,603 B1 | 3/2022 | Dhodapkar et al. | |
| 2003/0046218 A1* | 3/2003 | Albanese | G06Q 40/06 705/37 |
| 2005/0216390 A1* | 9/2005 | Snider | G06Q 40/04 705/37 |
| 2008/0162375 A1* | 7/2008 | Seely | G06Q 40/06 705/36 R |
| 2009/0276368 A1* | 11/2009 | Martin | G06Q 40/02 705/36 R |
| 2010/0280976 A1 | 11/2010 | Carpenter et al. | |
| 2012/0047054 A1 | 2/2012 | Vasinkevich | |
| 2013/0282580 A1 | 10/2013 | O'Brien et al. | |
| 2014/0136349 A1 | 5/2014 | Dave et al. | |
| 2015/0033256 A1 | 1/2015 | Patel et al. | |
| 2015/0095263 A1 | 4/2015 | Globe et al. | |
| 2015/0170112 A1 | 6/2015 | DeCastro | |
| 2015/0262173 A1 | 9/2015 | Durbin et al. | |
| 2015/0317733 A1* | 11/2015 | Chibly | G06Q 40/04 705/37 |
| 2015/0324764 A1 | 11/2015 | Van Rooyen et al. | |
| 2015/0324919 A1 | 11/2015 | Riggs et al. | |
| 2015/0332256 A1 | 11/2015 | Minor | |
| 2015/0371224 A1 | 12/2015 | Lingappa | |
| 2016/0148198 A1* | 5/2016 | Kelley | G06Q 20/065 705/69 |
| 2016/0342976 A1 | 11/2016 | Davis | |
| 2016/0342978 A1 | 11/2016 | Davis et al. | |
| 2016/0342985 A1 | 11/2016 | Thomas et al. | |
| 2016/0342987 A1 | 11/2016 | Thomas et al. | |
| 2016/0342994 A1 | 11/2016 | Davis | |
| 2016/0371771 A1 | 12/2016 | Serrano et al. | |
| 2017/0011460 A1* | 1/2017 | Molinari | H04L 9/3247 |
| 2017/0061396 A1 | 3/2017 | Melika et al. | |
| 2017/0091756 A1 | 3/2017 | Stern et al. | |
| 2017/0140371 A1 | 5/2017 | Forzley et al. | |
| 2017/0161734 A1 | 6/2017 | Bankston et al. | |
| 2017/0206523 A1 | 7/2017 | Goeringer et al. | |
| 2017/0213287 A1 | 7/2017 | Bruno | |
| 2017/0293898 A1 | 10/2017 | Rampton | |
| 2017/0330250 A1 | 11/2017 | Arjomand et al. | |
| 2017/0331828 A1 | 11/2017 | Caldera et al. | |
| 2017/0337534 A1 | 11/2017 | Goeringer et al. | |
| 2017/0352012 A1 | 12/2017 | Hearn et al. | |
| 2017/0352027 A1 | 12/2017 | Zhang et al. | |
| 2017/0353309 A1 | 12/2017 | Gray | |
| 2018/0052355 A1 | 2/2018 | Valdyanathan et al. | |
| 2018/0089645 A1 | 3/2018 | Mcdonald et al. | |
| 2018/0089759 A1 | 3/2018 | Stradling et al. | |
| 2018/0276754 A1 | 9/2018 | Agbamu | |
| 2018/0330281 A1 | 11/2018 | Teller et al. | |
| 2018/0330342 A1* | 11/2018 | Prakash | H04L 9/50 |
| 2018/0365764 A1 | 12/2018 | Nelson | |
| 2019/0034888 A1 | 1/2019 | Grassadonia et al. | |
| 2019/0034889 A1 | 1/2019 | Brock et al. | |
| 2019/0236591 A1 | 8/2019 | Iaremenko et al. | |
| 2020/0082365 A1 | 3/2020 | Brock et al. | |
| 2020/0387967 A1 | 12/2020 | Cella | |
| 2022/0198562 A1 | 6/2022 | Cella et al. | |
| 2022/0366494 A1 | 11/2022 | Cella et al. | |

FOREIGN PATENT DOCUMENTS

| | | |
|---|---|---|
| JP | 2016-181196 A | 10/2016 |
| KR | 2022462 B1 | 9/2019 |
| WO | 2016/186870 A1 | 11/2016 |
| WO | 2019/023168 A1 | 1/2019 |

OTHER PUBLICATIONS

Zuberi, et al., "Schumpeter's revenge: the gale of creative destruction: digital currencies and blockchain technology," Banking & Financial Services Policy Report 35.5: 1(8), Aspen Publishers, Inc. (May 2016).

Quibria, N., "Blockchain Holds Promise for Cross-Border Payments," American Banker, SourceMedia, Inc., vol. 1, Issue 122, pp. 1-4 (Aug. 10, 2015).

Buitenhek M., "Understanding and applying Blockchain technology in banking: Evolution or revolution?", Journal of Digital Banking, vol. 1, 2, (Apr. 12, 2016), pp. 111-119.

Examination Report for European Patent Application No. 18752380.8 dated Mar. 4, 2020.

International Search Report and Written Opinion for International Application No. PCT/US2018/043382, dated Oct. 25, 2018.

Extended European Search Report for European Patent Application No. 22156743.1 dated Mar. 10, 2022.

Rao, "Impact of Cryptocurrency on Money Supply Variations" CJCMR, vol. 4, Issue 10 (Oct. 2017), 13 pages.

Non-Final Office Action from U.S. Appl. No. 17/513,648, dated Oct. 10, 2023, 40 pages.

* cited by examiner

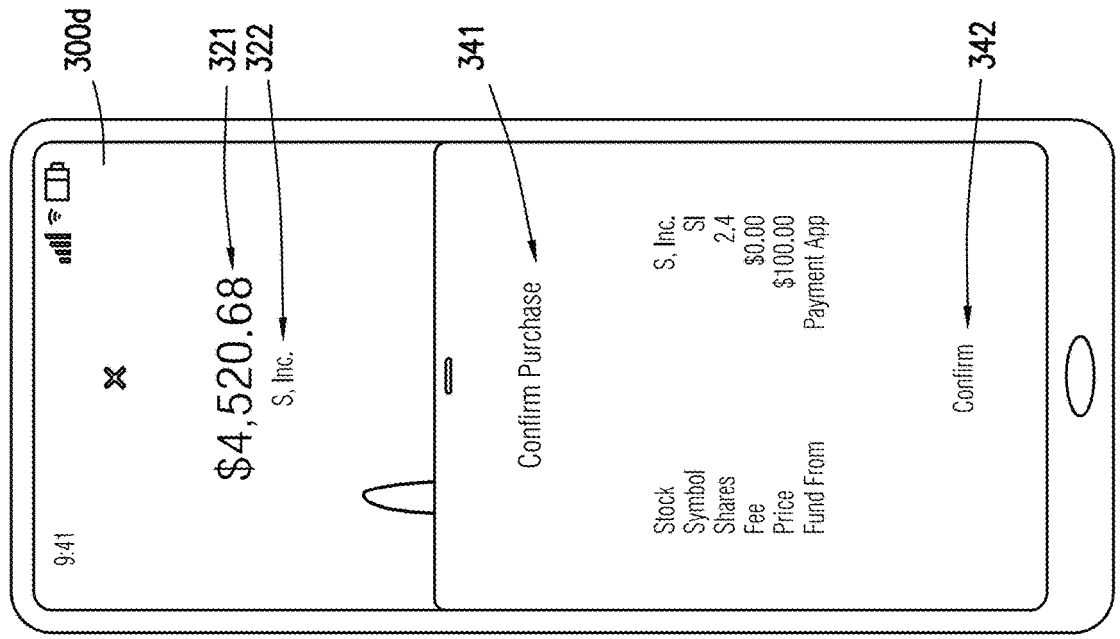
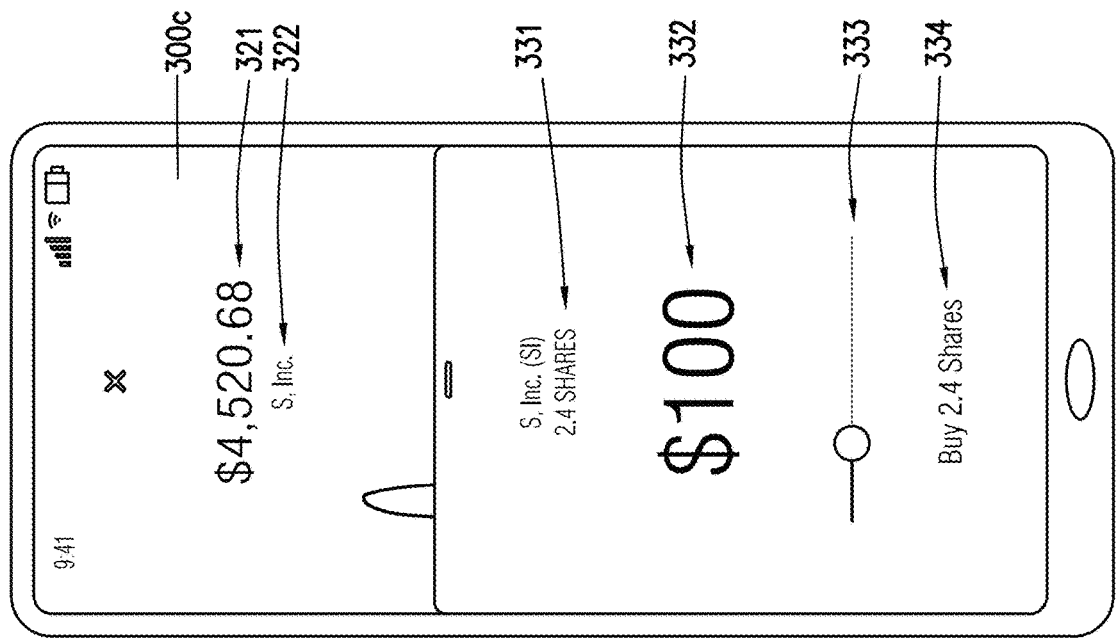
Fig. 3D
Fig. 3C

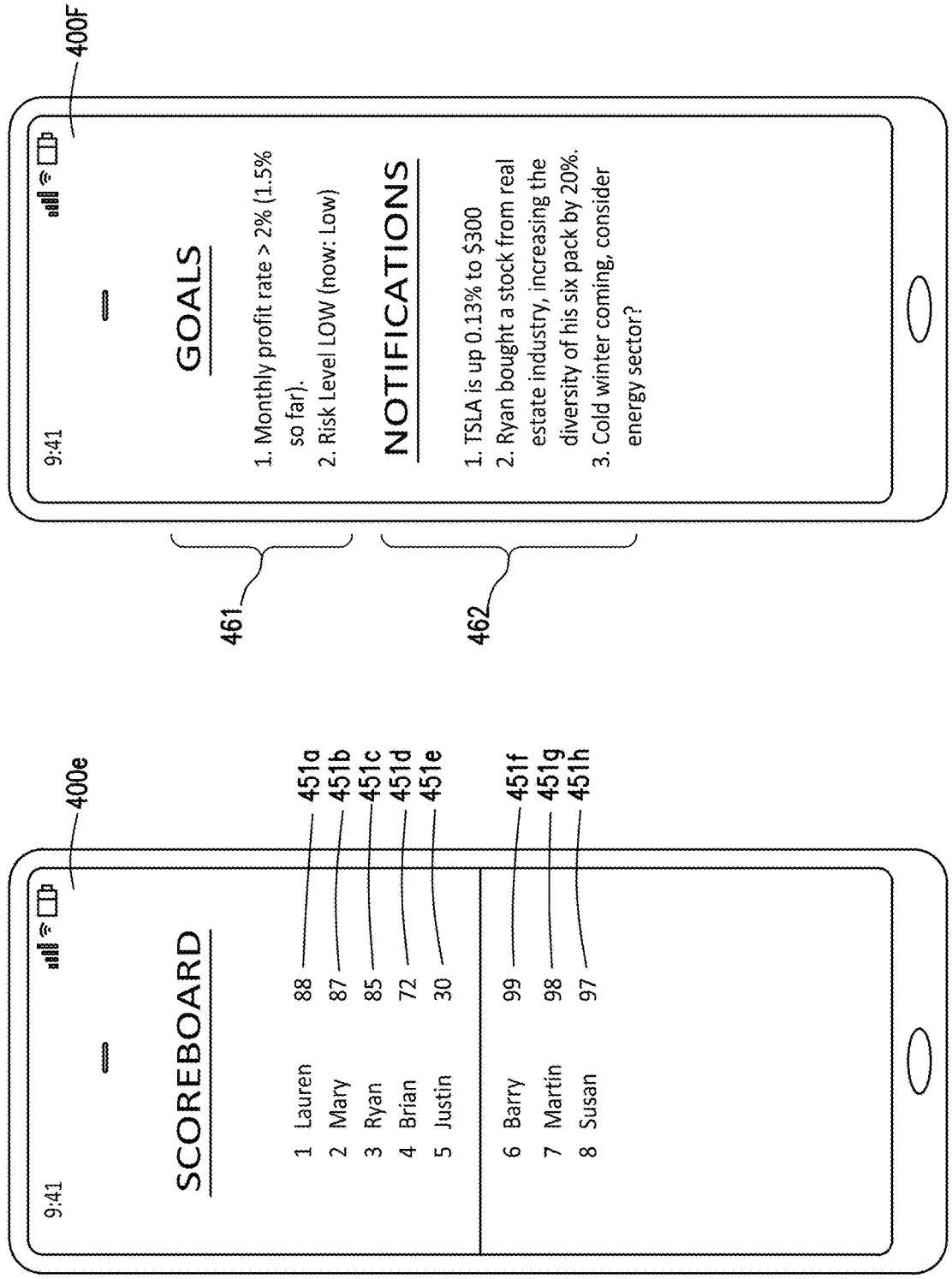

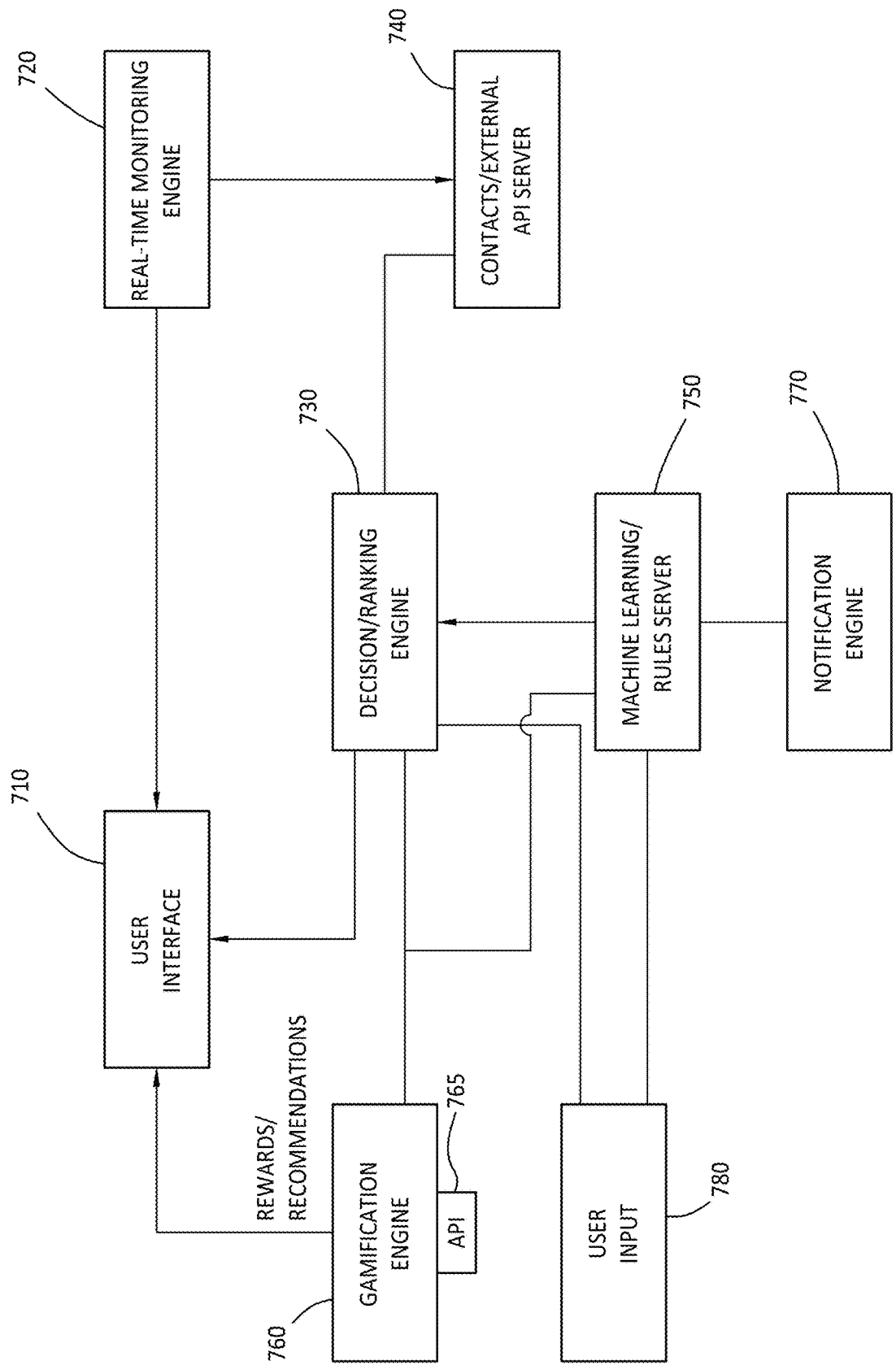

PAYMENT NETWORK FOR SECURITY ASSETS

PRIORITY

This application is a continuation under 35 U.S.C. § 120 of U.S. patent application Ser. No. 17/513,648, filed 28 Oct. 2021, which is a continuation under 35 U.S.C § 120 of U.S. patent application Ser. No. 16/147,501, filed Sep. 28, 2018, now U.S. Pat. No. 11,263,603, which claims the benefit, under 35 U.S.C. § 119(e), of U.S. Provisional Patent Application No. 62/715,780, filed 7 Aug. 2018, and which is a continuation-in-part under 35 U.S.C. § 120 of U.S. patent application Ser. No. 16/011,556, filed Jun. 18, 2018 and titled "Cryptocurrency Payment Network," now U.S. Pat. No. 10,163,079, which is a continuation under 35 U.S.C. § 120 of U.S. patent application Ser. No. 15/713,322, filed Sep. 22, 2017, now U.S. Pat. No. 10,055,715, which claims the benefit under 35 U.S.C. § 119(e) of U.S. Provisional Application No. 62/537,395, filed Jul. 26, 2017, each of which are expressly incorporated by reference herein in their entirety.

BACKGROUND

Security assets such as stocks, derivatives, bonds, and debentures have long been used by the public as investment instruments. A security may represent debt, equity, or may be derivative from other assets. A security may be represented by a tangible certificate, or electronically by data records. Investors may acquire or trade securities in primary or second markets. Various security exchanges allow investors to buy and sell securities. One or more online platforms may be provided by the security exchanges or one or more brokers of securities. Investors may access the online platforms through a browser, a mobile application, or other suitable software. The online platform may display information about securities (e.g., pricing information), provide analysis tools, receive orders from the investors, and communicate with other systems to cause the orders to be executed.

To date, although security assets are widely held among the public, they have not been used as instruments for making everyday payments and are generally not accepted by merchants (e.g., retailers), as compared to other asset types (e.g., fiat currency or cryptocurrency). Several factors prevent the use of security assets as payment instruments. First, the transfer of security is generally associated with longer transaction times than a simple transfer of fiat currency. As the value of security assets may fluctuate with respect to the fiat currency, accepting security assets may add to the risk for merchants. Second, exchanges and brokers often do not allow the purchase or transaction of security assets in fractions of their base units. As security assets can often be expensive (e.g., thousands of dollars), it may impossible to transfer the exact value of a payment using units of security assets. Third, a transfer of security assets may involve substantial transaction costs that are likely to be imposed on merchants or customers.

BRIEF DESCRIPTION OF THE DRAWINGS

FIGS. 3A-3F illustrate example user interfaces for purchasing security assets using an example mobile application associated with a payment service.

FIGS. 4A-4F illustrate example user interface associated with managing groups of security assets and gamification of investment activities.

FIG. 7 illustrates an example system architecture for implementing one or more investment gamification features.

DESCRIPTION OF EXAMPLE EMBODIMENTS

Figure 1A:
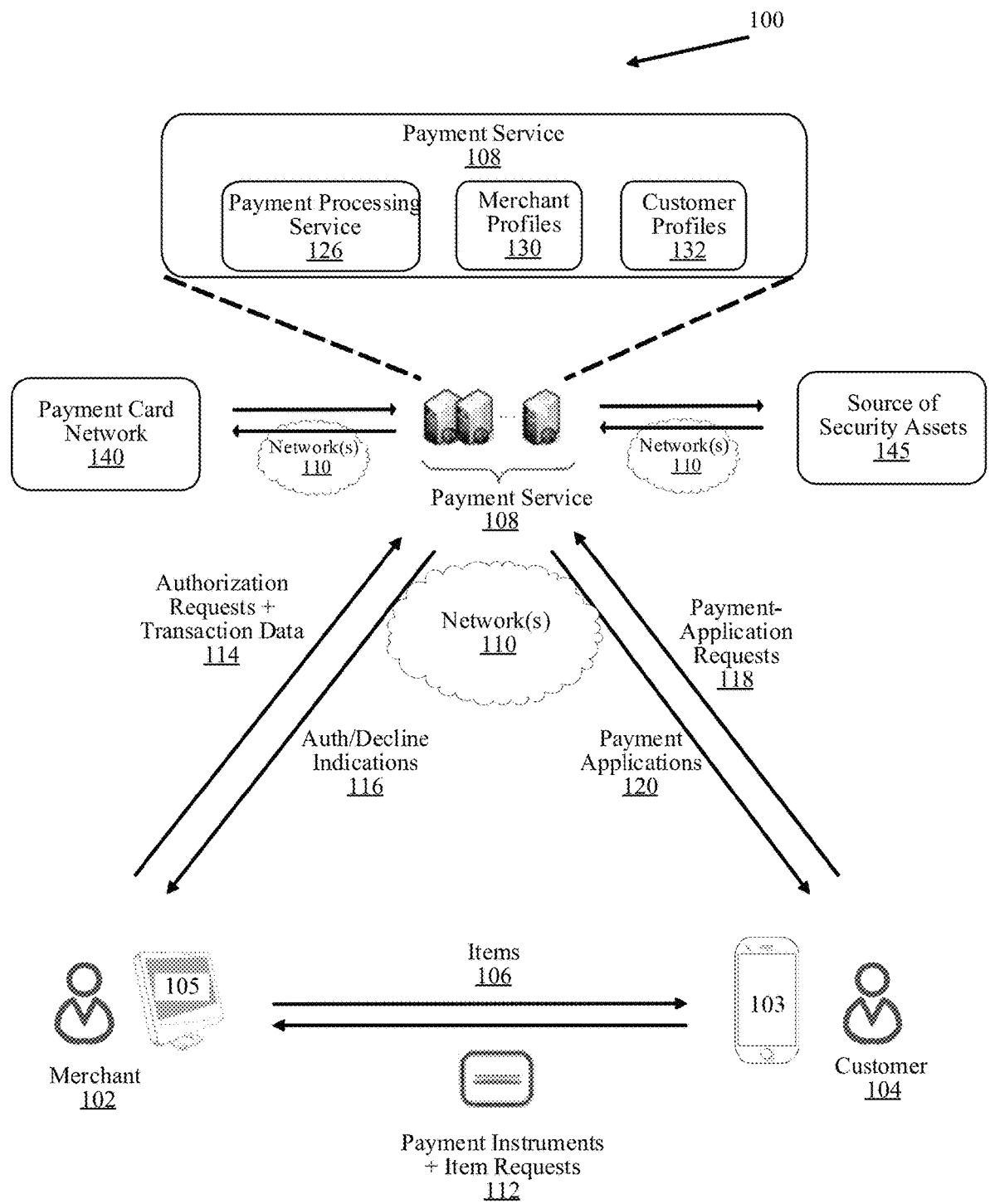
FIGS. 1A and 1B illustrate an example payment service network.

Particular embodiments described herein enable management of security assets along with fiat currency and other assets through a payment service system, purchase and sale of security assets in fractions of their base units, and payment transactions using arbitrarily specified quantities of available security assets. Particular embodiments substantially reduce the cost and improve the efficiency associated with transfer of security assets.

In particular embodiments, a payment service system may provide a platform for its user to purchase, sell, transfer, or otherwise manage their security assets. The payment service system may acquire security assets from one or more third-party sources of such assets (e.g., a stock exchange) and allow its users to purchase all or a portion of the security assets. In particular embodiments, the payment service system may manage one or more financial accounts for the user. Each financial account may hold a quantity of fiat currency owned by the user or other assets owned by the user (e.g., cryptocurrency tokens). The payment service system may also have access to one or more financial accounts associated with the user that are managed by one or more third-party systems (e.g., banks). In particular embodiments, the payment service system may provide the security assets it acquired for sale to its users. A user may purchase security assets held by the payment service using, for example, money managed by the payment service, money in a checking account that the user has authorized the payment service to access, cryptocurrency stored in a wallet provided by the payment service system, other suitable assets, or any combination thereof. In particular embodiments, when a user purchases security assets from the payment service, the payment service may refrain from directly transferring title to the security assets to the user. Rather, the payment service may continue to control the security assets and may record and track user ownership interests using a data structure to indicate the user's ownership interest in the security assets. In other words, particular embodiments may provide an asset management service between users and markets for security assets. By effectually transferring ownership in security assets using embodiments described herein, the payment service system may increase the efficiency and flexibility of such transactions involving security assets.

In particular embodiments, the payment service system may maintain a data structure designed for recording asset ownership for various users. As an example and not by way of limitation, the payment service system may store one or more ledgers for tracking assets held by the payment service system—each such asset being held by the payment service system may be owned in whole or in part by the payment service system itself and/or in whole or in part by one or more users of the payment service system. The ledger(s) may store service balances associated with the payment service representing quantities of assets held by the payment service. The service balances may comprise, for example, a fiat currency balance for each of one or more fiat currencies, a cryptocurrency balance for each of one or more cryptocurrencies, a securities balance for each of one or more security assets, other suitable data records, or any combination thereof. The payment service system may also store additional ledgers for each of a number of users. The ledger(s) may be stored as part of a profile for each user. One or more ledgers may store user balances representing quantities of assets held by the payment service and owned by one or more users. They may have similar contents to the service balances. The payment service system may use other data structures suitable for storing information representing ownership of assets.

In particular embodiments, a user may purchase security assets from the payment service by sending a purchase order to the payment service system. The user may cause the purchase order to be generated by interacting with one or more elements in a user interface associated with the payment service. The user interface may be provided, for example, in a mobile application provided by the payment service or on a webpage displayed by a browser installed on a computing device. The purchase order may specify a particular security asset (e.g., stock of a particular company) and a quantity of the security asset to purchase. The payment service system may compute a price for the requested amount of the security asset, then execute the purchase by updating one or more internal ledgers. For example, the payment service system may decrease a US dollar balance associated with the user by the computed price and increase a securities balance associated with the user by the requested amount of the specified security asset. The payment service system may correspondingly increase a US dollar balance associated with the payment service by the computed price and decrease a security balance associated with the payment service by the requested amount of the specified security asset. The change price for the requested amount of the security asset may be calculated based on a current market price of the security asset. In this case, although the security assets being purchased are still held by the payment service, the payment service records and tracks user ownership interests using its ledgers. Because ownership interests in security assets may be transferred based on reassigning ownership thereof on the ledgers, the user may be able to purchase the security assets in fractions of their base units. For example, a user may be allowed to buy 2.4 shares of a particular company. Such flexibility is often unavailable for investment in particular asset classes. In particular embodiments, the user may send a sell order of a particular security asset to the payment service system. The payment service may execute this transaction by, for example, increasing a currency balance and decreasing a security balance of the user, while at the same time, decreasing a currency balance and increasing a security balance of the payment service.

The payment service may also facilitate user-to-user transfer of security assets. In particular embodiments, a first user may transfer a quantity of security assets to a second user via the payment service. For example, the payment service system may receive a request for security-asset transfer, the request identifying the first user, the second user, a particular security asset to be transferred, and a quantity of the security asset to be transferred. In response to the request, the payment service system may execute this transfer by modifying the respective securities balances of the first user and the second user. In particular embodiments, two users may reach a deal to swap assets and may cause the deal to be executed through the payment service. Each user may send a digital signature to the payment service system approving the transaction. In response, the payment service may execute the transaction by updating the balances of the users corresponding to the assets. For example, a first user may swap 2.5 shares of a Company A for 110 shares of a Company owned by a second user. After receiving a corresponding request, the payment service system may decrease the balance of Company A stock assigned to the first user and increase the balance of Company A stock assigned to the second user. At the same time, the payment service system may increase the balance of Company B stock assigned to the first user and decrease the balance of Company B stock assigned to the second user. The assets may or may not fall within the same asset class. For example, a first user may similarly swap 1 bitcoin for municipal bonds of a $5,000 face value.

In particular embodiments, the payment service system may facilitate users to invest in groups or packs of security assets. The payment service system may send, to a client device associated with a user, instructions to display one or more recommendations of packs of security assets. Each pack may comprise a plurality of security assets. The security assets for a particular pack may be identified based on one or more criteria such as industry, stage of growth, risk management, diversity, other suitable criteria, or any combination thereof. As an example and not by way of limitation, a recommended pack may comprise ten stocks associated with five emerging companies and five well-established companies providing cloud computing services. As another example and not by way of limitation, a recommended pack may comprise a combination of stocks, bonds, and gold futures. Each security asset included in a pack may be assigned a particular weight. The weight may be specified by a currency value at a particular time point (e.g., equivalent U.S. dollar value at the time of purchase) or by units used to measure the security assets (e.g., a different number of shares associated with each security asset). A user may request to purchase a particular value of a particular recommended pack (e.g., $100 of cloud-computing pack). In response, the payment service system may calculate a respective value assigned to each of the security assets included in the pack and update data records representing ownership of these assets accordingly. In particular, the payment service system may debit a currency balance associated with the user in the amount of the particular value while crediting multiple securities balances associated with the user and corresponding to the security assets included in the pack. The payment service system may also credit a currency balance of the payment service in the amount of the particular value and debit multiple securities balances of the payment service and corresponding to the security assets included in the pack. In particular embodiments, the payment service system may also prompt a user to create a pack of security assets. The user may identify the assets to be included in the pack and the weight assigned to each of the assets.

In particular embodiments, the payment service system may facilitate payments using security assets as the form of payment. A customer may use the payment service to pay for a product or service provided by a merchant. The customer may opt to make the payment using security assets held by the payment service and owned by the customer rather than a fiat currency. In particular, the payment service system may receive a request for payment from a point-of-sale system associated with a merchant. The request for payment may specify a payment amount in a fiat currency. The payment service system may provide the customer multiple payment options. The customer may select an option to pay using security assets. The payment service system may calculate a quantity of a security asset of an equal value to the payment amount based on a current price of the security asset. The payment service system may then initiate a transfer of the determined amount of the security asset from the customer to the payment service and a transfer of fiat currency of the payment amount from the payment service to the merchant. In this manner, the payment service may allow the customer to pay directly in security assets and the merchant to get paid in a fiat currency.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

FIG. 1A illustrates an example payment service network environment 100. Merchant 102 may conduct transactions with customer 104 (or "user 104") for items 106 offered by the merchant 102. FIG. 1A also illustrates a payment service system 108 (also referred to as "payment service"), coupled to merchant point-of-sale (POS) device 105 and customer device 103 via a network 110, to authorize payment instruments of customer 104.

Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, Visa (EMV) standard, i.e., EMV cards. In other examples, other types of payment instruments include cards or computing devices that communicate via radiofrequencies such as a radiofrequency identification tags, and near field communication devices, etc.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service 108 over network 110, either substantially contemporaneously with the conducting of the transaction (in the case of online transactions) or later when POS device 105 is in the online mode (as in the case of offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, identity and/or contact information of the customer, and a payment instrument used in the transaction.

After conducting an offline transaction with customer 104, POS device 105 may provide the stored information (or some subset of it) to the payment service 108 over the network 110. The network 110 may represent any one or more wired or wireless networks, such as a Wi-Fi network, a cellular network, or the like. In an online transaction, POS device 105 may send this information to payment service 108 over network 110 substantially contemporaneously with the transaction with the customer.

After merchant 102 receives the payment information from customer 104, merchant 102 may send respective authorization requests, along with information regarding the respective transactions, to payment service 108, as illustrated at 114. Payment service 108 may include payment processing service 126, merchant profiles 130, and customer profiles 132. Here, the merchant profiles 130 may comprise information about one or more merchants using the payment service 108. The customer profiles 132 may comprise information about one or more customers using the payment service 108. Each merchant or customer may otherwise be called a user of the payment service 108. A particular user may be a merchant, a customer, or either depending on the use case.

The payment processing service 126 may receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

When a customer and a merchant enter into an electronic payment transaction, the transaction may be processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110 to conduct financial transactions electronically. Payment processing service 126 may also communicate with one or more computing devices of one or more banks, processing/acquiring services, or the like over the network 110. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service 108.

An acquiring bank may be a registered member of a card association (e.g., Visa®, MasterCard®), and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service 108 may communicate over network(s) 110 with one or more cryptocurrency networks. Such networks may include for example, the Bitcoin network, the Ethereum network, etc. Cryptocurrency networks are commonly associated with a network of parties that cryptographically verify and validate transactions and record transactions on copies of a distributed ledger commonly called the blockchain. Once a transaction has been validated, a cryptocurrency network may approve the transaction by writing the transaction to the blockchain. The time for such processes to complete may be impractically long for many applications.

In particular embodiments, the payment service 108 may communicate over network(s) 110 with a source of security assets 145. The source of security assets 145 may comprise a broker of security assets, an exchange for security assets, an issuer of security assets, a security-asset liquidity service, another suitable third-party source, or any combination thereof. The payment service system 108 may acquire ownership interests in security assets by sending one or more purchase orders to the source of security assets 145. In return, the payment service system 108 may receive one or more certificates, tokens, security keys, or other information representing the ownership interest. The payment service system 108 may also sell ownership interests in security assets back to the source of security assets 145. The payment service system 108 may receive fiat currency or another type of asset in return. The payment service system 108 may select particular security assets to acquire from the source 145 and make available to the users. The security assets to acquire may be selected based on user demand (e.g., determined based on requests to purchase particular assets).

While FIG. 1A illustrates merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) determines when the customer visits physical premises or a digital presence of the merchant. For instance, the device 103 of the customer 104 may include an application (e.g., an application provided by payment service 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service 108 may determine when the customer is present at the merchant in any other number of ways. In each instance, after payment service 108 receives an indication that customer 104 is located at merchant 102, the payment service 108 may determine whether to send one or more previously expressed item preferences of the customer to the merchant.

In addition, customer 104 may desire to receive an instance of a payments application, such as a mobile wallet application, from the payment service 108. FIG. 1A illustrates, at 118, that the customer 104 may send payment-application requests to payment service 108. In response, at 120, payment service 108 may provide instances of the application back to customer device 103. In addition, payment service 108 may map an identification of the instance of the application to the customer profile.

According to an implementation of the present subject matter, the customers and merchants may send and receive payments in security assets via the payment service for purchase of items or a selected set of items. In another implementation, the customers may send payments in security assets via the payment service, while the payment service converts a security asset into another asset of the merchant's choice.

Figure 1B:
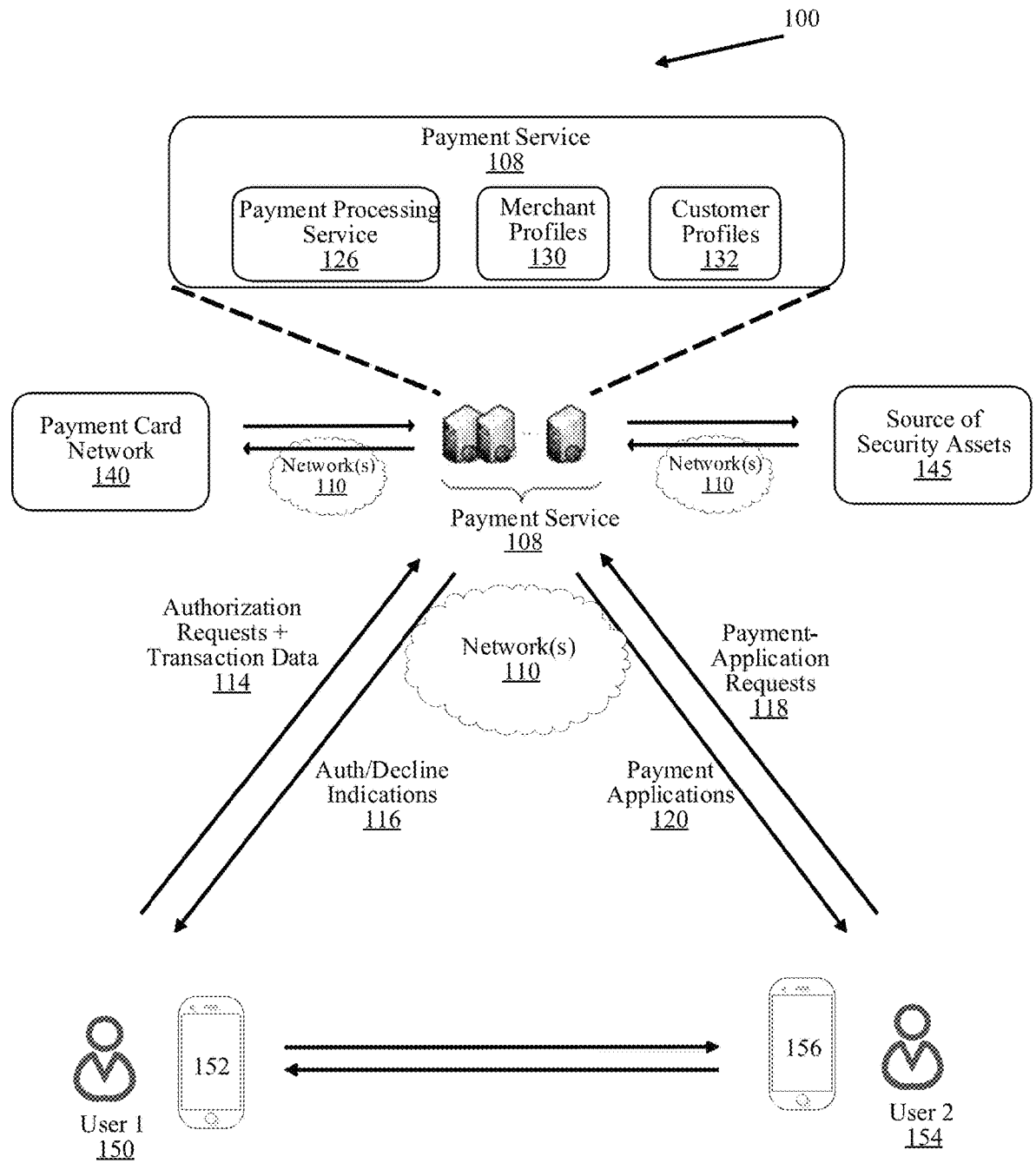

FIG. 1B illustrates another embodiment of example environment 100 except that in FIG. 1B a transaction is between an operating device 152 of a first user 150, and an operating device 156 of a second user 154. Devices 152 and 156 may be a computing device with an application provided by payment service 108 executing thereon. In some embodiments, the application may be a point-of-sale application. In some embodiments, the application may be a mobile wallet application. In some embodiments the application may be an application provided by a third party capable of accessing at least one payment account.

FIG. 1B illustrates a broader concept—that the present technology contemplates that currency or assets may be sent from any party of any character (merchant, user, bank, etc.) to any other party of any character using the innovations described herein.

Figure 2:
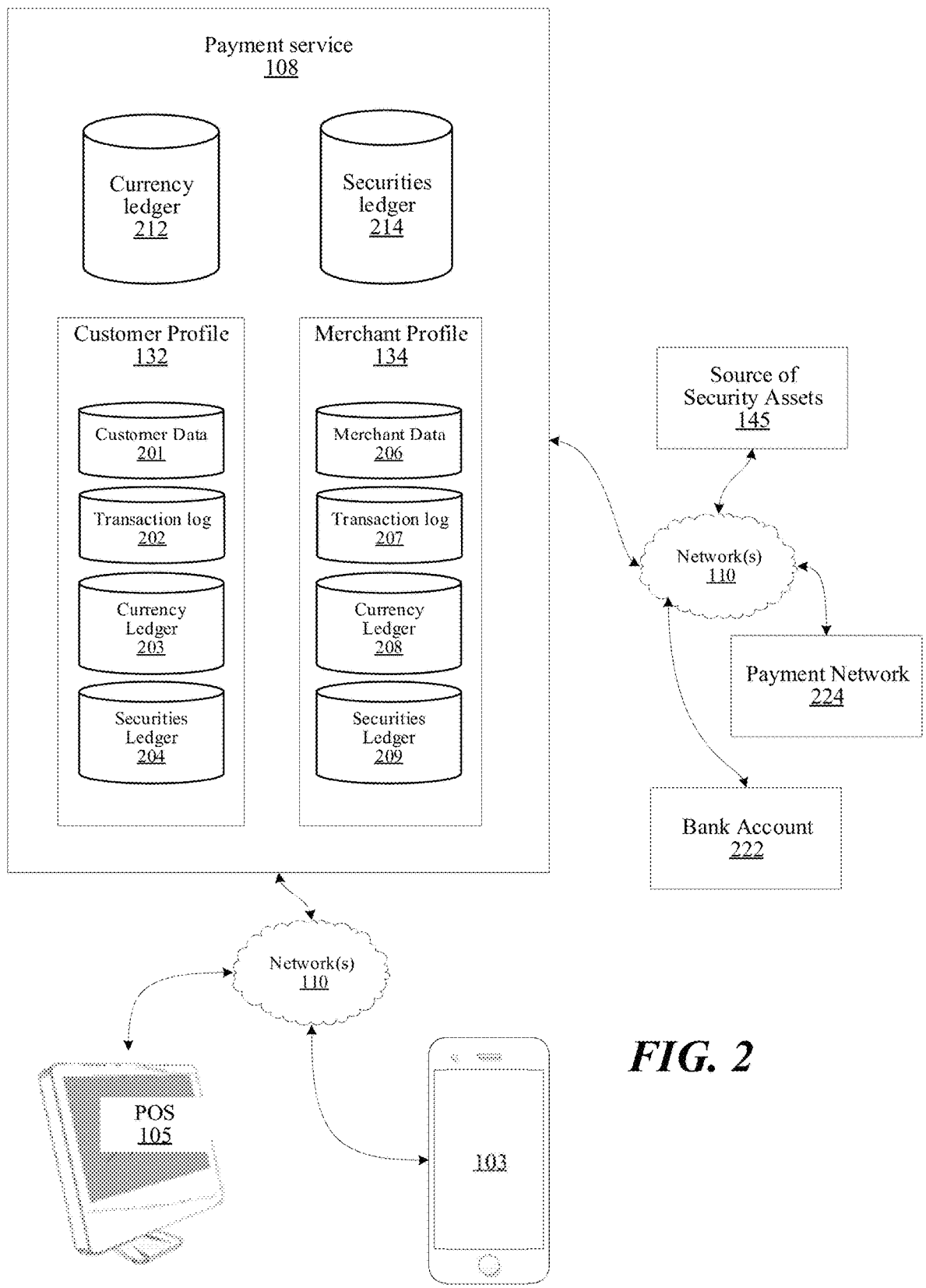
FIG. 2 illustrates an example system architecture for a payment service system.

FIG. 2 illustrates an example system architecture for a payment service system 108. In particular embodiments, the payment service system 108 may store customer profile 132 for each of a plurality of customers. Customer profile 132 may include customer data 201 that may include customer-identifying information (name, contact information, etc.), a transaction log 202 including records of past transactions involving payment service 108 by customer 104, information regarding linked accounts (credit card information, bank account information, etc.), information regarding services utilized by customer profile 132 (e.g., a mobile wallet application). The customer data 201 may further comprise information associated with one or more social or peer-to-peer contacts of a user (e.g., friends, family members). The information may comprise at least part of the profile information of such contacts.

The customer profile 132 may also include a ledger for any accounts managed by payment service 108 on behalf of customer 104. It will be appreciated that customers having accounts managed by the payment service is an aspect of the technology that enables technical advantages of increased processing speed and improved security. For example, the customer profile 132 may include a currency ledger 203. The currency ledger 203 may store a balance for each of one or more currencies (e.g., US dollar, Euro, bitcoin) that the customer owns. The customer profile 132 may also include a securities ledger 204. The securities ledger 204 may store a balance for each of one or more security assets (e.g., stocks, bonds, futures) that the customer owns. The currency ledger 203 and the securities ledger 204 may utilize any suitable data structure. As an example and not by way of limitation, a separate ledger may be used to record information about each individual asset owned by the customer. Various ledgers associated with a particular customer may be stored all together, in groups, or separately. As another example and not by way of limitation, the currency ledger 203 and the securities ledger 204 may be logical ledgers. The associated with the ledgers may all be saved in a single file, data set, or database. In other words, a customer's ownership interest in a plurality of types of assets (e.g., fiat currency, cryptocurrency, security assets) may all be recorded in a composite ledger or be separated recorded in a plurality of ledgers.

Each account ledger (203, 204) may reflect a positive balance when customer 104 funds the accounts. An account may be funded by transferring currency in the form associated with the account from an external account (e.g., transferring a quantity of cash to payment service and the value is credited as a balance in currency ledger 203), or by purchasing currency in the form associated with the account from the payment service using currency in a different form (e.g., buying a value of cryptocurrency from payment service 108 using a value of fiat currency, and crediting the value of cryptocurrency in currency ledger 203), or by conducting a transaction with another user (customer or merchant) of the payment service wherein the account receives incoming currency. An account may be funded by purchasing security assets via the payment service system 108. When a customer requests to purchase security assets from the payment service 108, the payment service 108 may debit a balance stored in the currency ledger 203 and credit a balance stored in the securities ledger 204. In particular embodiments, customer profile 132 may comprise preference settings as to a quantity of security assets to keep. As an example and not by way of limitation, the payment service 108 may automatically cause a sale of security assets for the customer, thus debiting the securities ledger and crediting the currency ledger, when the payment service 108 determines a risk index associated with the security assets owned by the customer exceeds a threshold value. As another example and not by way of limitation, the payment service 108 may automatically cause a purchase of security assets by the user when a balance associated with the securities ledger 204 drops below a stated level. The customer profile 132 may also comprise preference settings as to a preferred asset for payments (e.g., a preference to use a particular security asset to pay for day-to-day transactions).

Similarly, as introduced with respect to FIGS. 1A and 1B, payment service 108 may store merchant profile 134. The merchant profile 134 may comprise merchant data 206, transaction log 207, currency ledger 208, and securities ledger 209. The merchant data 206 may comprise one or more preference settings associated with the merchant 102, such as a type of currency or asset that the merchant prefer to receive as payment. The information stored in the merchant profile 134 may be made accessible and managed by a merchant 102 through a POS device 105 or other suitable devices associated with the merchant 102.

In particular embodiments, the payment service 108 may acquire security assets from a third-party source 145. The payment service 108 may directly purchase or sell security assets to one or more sources 145. The payment service 108 may also enter into contractual relationships with one or more sources 145 such that the sources 145 provides liquidity of security assets to the payment service 108. The payment service 108 may maintain a currency ledger 212 recording a quantity of cash or other currencies held by the payment service 108 and a securities ledger 214 recording a quantity of security assets held by the payment service 108. The currency ledger 212 and the securities ledger 214 may also specify the portion of the assets held by the payment service 108 that is owned by one or more users of the payment service 108 and the portion of the assets that is owned by the payment service 108. When the payment service 108 has its own holdings of security assets, customers may acquire security assets directly from the payment service 108. In particular embodiments, the payment service 108 may use computational models or algorithms to dynamically and intelligently control buying and selling activities with respect to security assets. The algorithms may be designed for maintaining the security assets owned by the payment service 108 at a desired level. The desired level may be based on a volume of transactions over a period, balances of collective customer profiles securities ledgers, exchange rates, or trends in prices of security assets. As an example and not by way of limitation, the payment service system 108 may manage its holdings of security assets to minimize the security assets owned by the security service. The payment service system 108 may calculate a projected demand by customers for a particular security asset (e.g., a quantity of the security asset the customers likely to buy in a particular time period). The payment service system 108 may maintain a level of the security asset just enough to satisfy such a projected demand. As another example and not by way of limitation, the payment service system 108 may dynamically adjust its holdings of security assets based on analysis of market conditions. The payment service system 108 may increase its holdings of security assets having an upward trend in value and decrease its holdings of security assets having a downward trend in value.

When two users engage in a transaction that involves a transfer of assets, such a transaction may be reflected on the ledgers associated with each customer's profile 132. As an example and not by way of limitation, a first user may transfer a quantity of security assets to a second user. The payment service system 108 may accordingly debit the securities ledger 204 of the first user and credit the securities ledger 204 of the second user.

Additionally, customer 104 may also have one or more external payment cards registered with payment service 108. The external payment cards may be associated with external bank accounts 222. The external payment card accounts may not be managed by payment service 108. Instead, an appropriate external payment network 224 may process transactions conducted with payment cards.

Additionally, customer 104 may also have one or more internal payment cards registered with payment service 108. Internal payment cards may be linked to all accounts associated with customer profile 132. In some embodiments, options with respect to internal payment cards may be adjusted and managed using a payment application installed on the customer device 103. For example, when customer profile 132 includes multiple payment accounts (e.g., cryptocurrency and fiat currency), application 210 may set one of those accounts to be the default account for debits or credits when using an internal payment card.

Customer 104 may access and monitor customer profile 132 including payment cards registered with payment service 108, currency ledger 203, and securities ledger 204 through the application installed on the customer device 103. The application may be a customer facing application provided by payment service 108, or that is configured to access customer profile 132 through use of one or more APIs provided by payment service. In some embodiments, application on the customer device 103 may provide digital wallet functionality including storing payment methods and permitting electronic payments by customer device 103 at the instruction of application.

Figure 3B:
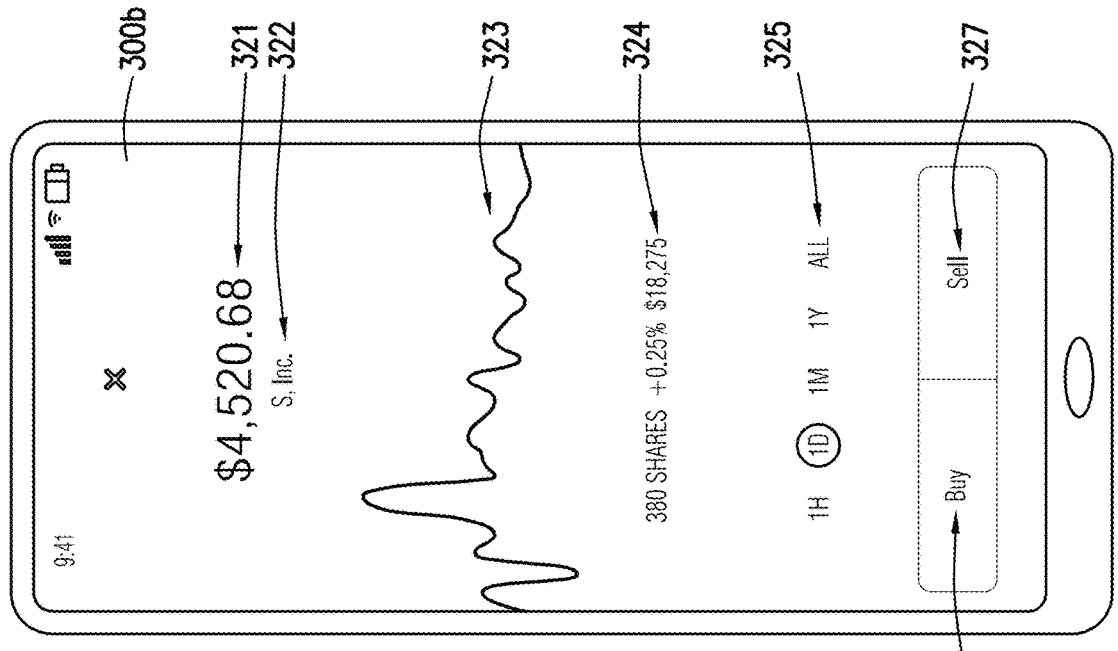
Figure 3A:
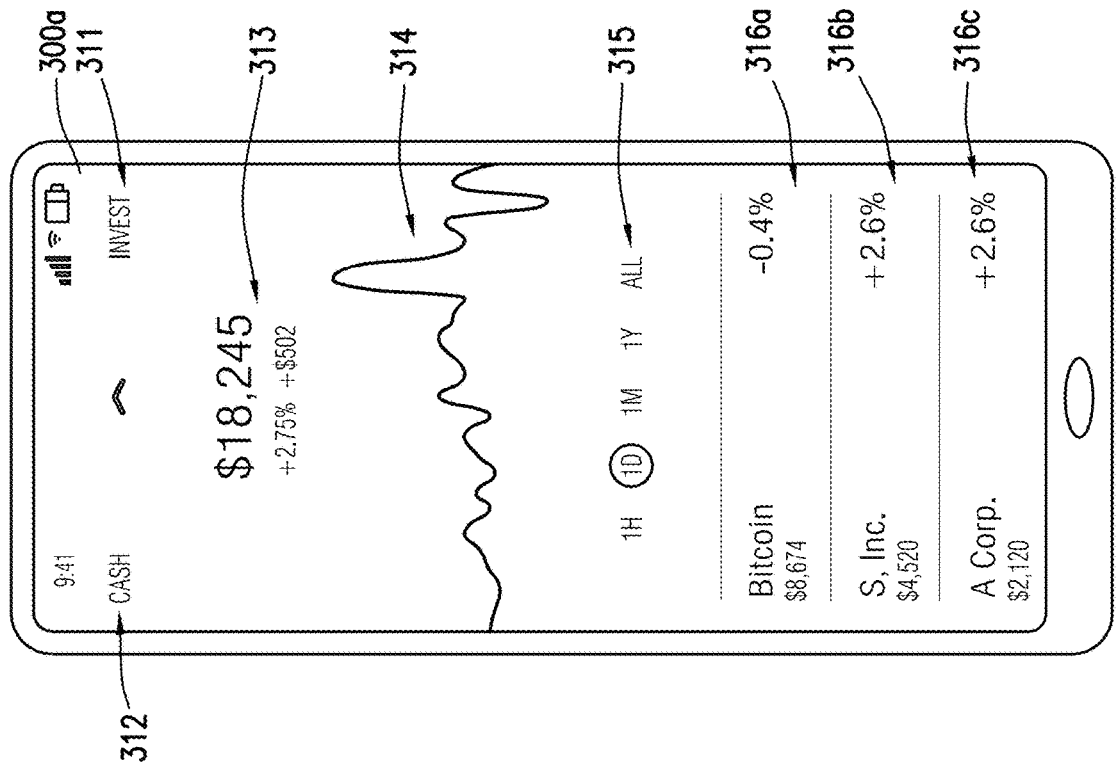

FIGS. 3A-3F illustrate example user interfaces for purchasing security assets using an example mobile application associated with a payment service 108. The mobile application may provide functionalities for a user to buy, sell, and manage security assets. As illustrated by FIG. 3A, such functionalities may be provided in the user interface 300a. The user interface 300a may comprise a "INVEST" button 311 directing the user to an interface for purchasing security assets and a "CASH" button 312 directing the user to an interface for managing one or more fiat currencies and one or more financial accounts. The user interface 300a may also comprise a data field 313 summarizing a total value of security assets owned by the user and a change in the value (e.g., percentage and monetary value) in a particular period of time. The user interface may comprise a chart field 314 visualizing the fluctuation of the value of the security assets owned by the user. At time period field 315, a user may select a relevant time period for the securities value chart 314. The user interface 300a may comprise fields 316a-c listing the user's ownership of assets. For example, field 316a may display information about bitcoin owned by the user; field 316b may display information about shares of S, Inc. owned by the user; field 316c may display information about shares of A Corp. owned by the user. The user may interact with one of the fields 316a-c to review more detailed information about a particular asset. For example, the user may click on the field 316b to be transferred to the user interface 300b shown in FIG. 3B.

The user interface 300b shown in FIG. 3B displays detailed information about shares of S, Inc. held by the user. This user interface may comprise a field 321 showing a total value of S, Inc. shares (indicated in a field 322) owned by the user. A price chart field 323 may visualize the fluctuation in the value of S, Inc. shares owned by the user during a period set in field 325. The field 324 may show details about the user's investment in S, Inc., including the number of shares, a percentage change of the value, and a total value of the user's entire investment. The user interface 300b may comprise a "BUY" button 326 and a "SELL" button 327 allowing the user to buy and sell S, Inc. shares, respectively. After the "BUY" button 326 or the "SELL" button 327 are interacted with by the user, an application providing the user interface 300b may further provide for display to the user various options related to buy or sell orders (e.g., market, limit, stop loss) and may allow the user to specify various parameters of the order (e.g., number of shares, value of cash to be spent).

The mobile device may switch to the user interface 300c shown in FIG. 3C if the user presses the "BUY" button. In this user interface 300c, a pop-up section is displayed comprising information and interactive elements relevant to purchasing S, Inc. shares. The pop-up section may comprise a field 331 specifying the company whose shares are to be purchased and a field 332 specifying the amount of money to invest. It may further comprise a sliding bar 333 allowing the user to adjust the amount of money to invest and a button 334, which the user may press to execute the purchase.

If the user interacts with the button 334, the mobile device may display the user interface 300d shown in FIG. 3D, which comprises a pop-up section 341 displaying information about a purchase order generated based on user input. The pop-up section 341 may comprise a "Confirm" button 342 allowing the user to confirm the purchase.

Figure 3F:
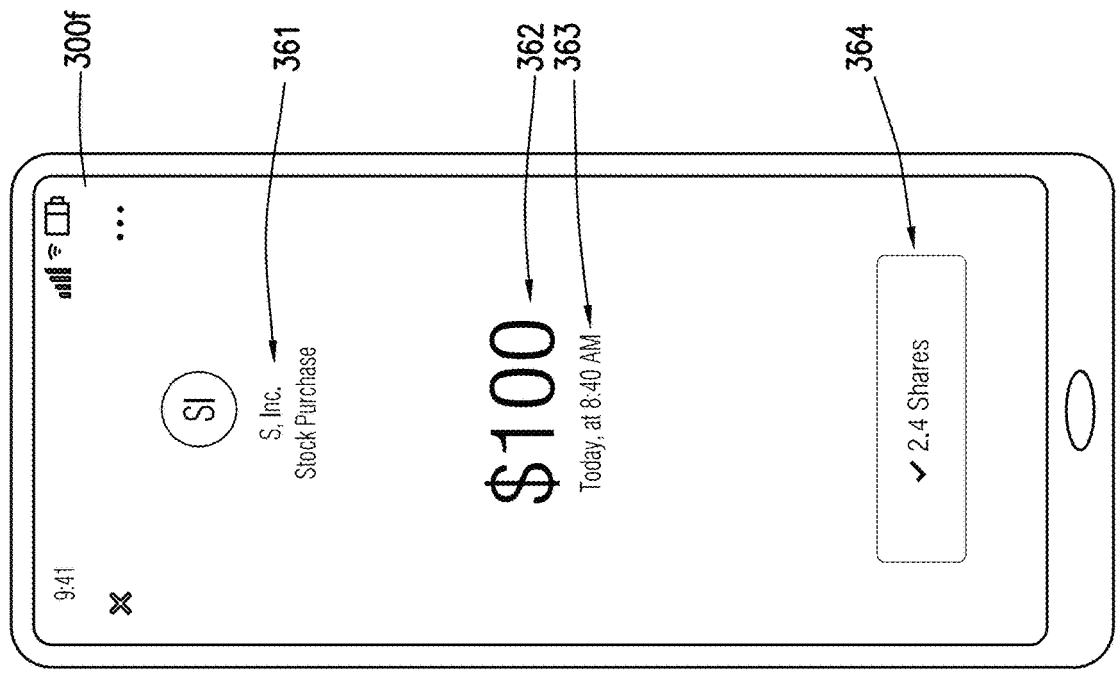
Figure 3E:
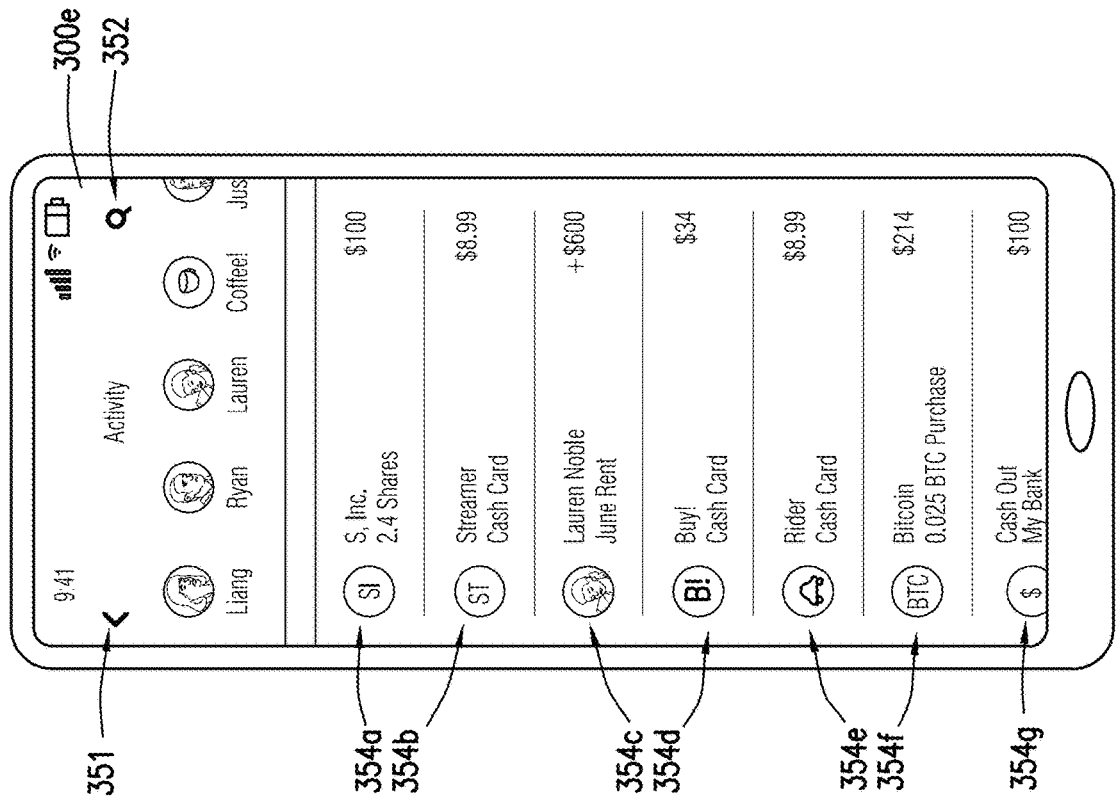

The user interface 300e shown in FIG. 3E displays a transaction history associated with the user. It may comprise a button 351 for going back to the previous interface and a search button 352 to perform a search of the transaction history. The user interface 300e may comprise a list of items 354a-g each corresponding to a transaction. For example, the item 354a may correspond to a purchase of 2.4 shares of S, Inc. using $100. The item 354c may correspond to a payment of $600 from a friend Lauren. The items 354b, 354d, and 354e may correspond to payments made using a payment card issued by the payment service 108. The item 354f may correspond to a purchase of bitcoin using US dollars. The item 354g may correspond to a cash-out transfer of funds from a financial account managed by the payment service 108 to an external bank account. The user may interact with an item 354 to pull up more detailed information about the transaction (shown in FIG. 3F).

FIG. 3F illustrates a user interface 300f that displays details about a transaction. The user interface 300f comprises a field 361 identifying the nature of the transaction (e.g., S, Inc. stock purchase), a field 362 showing the amount of money invested, a field 363 showing the time of the transaction, and a field 364 showing a quantity of the security asset purchased.

Figure 4B:
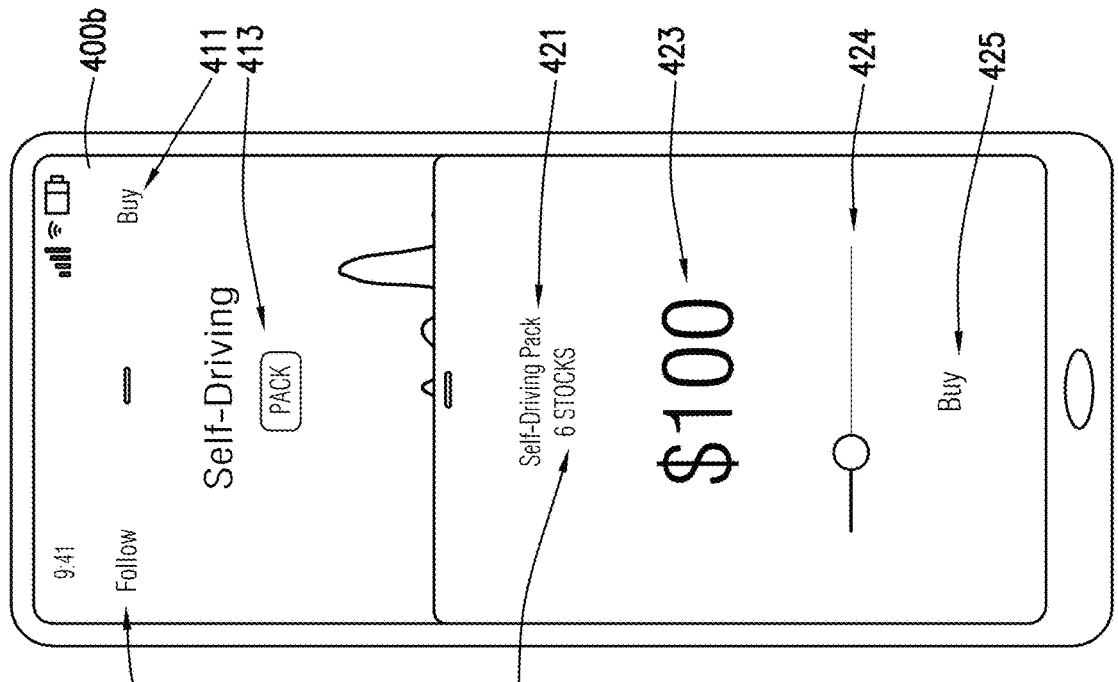
Figure 4A:
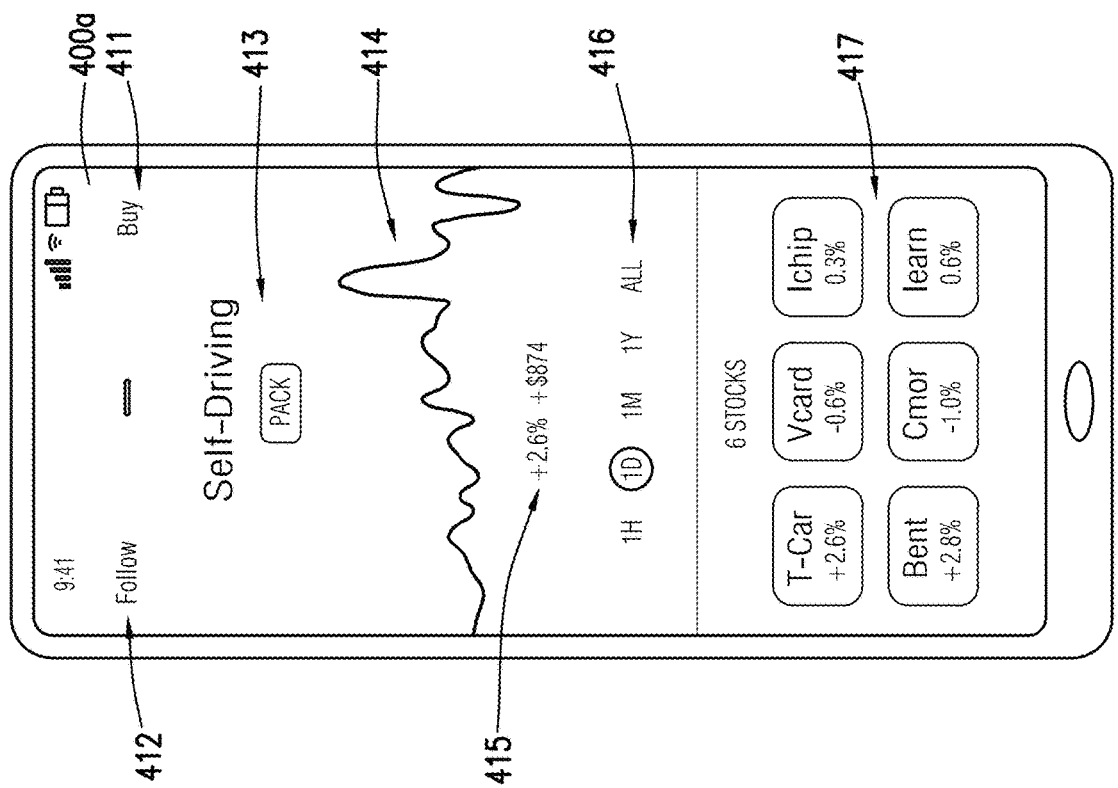

FIGS. 4A-4F illustrate example user interface associated with managing groups of security assets and gamification of investment activities. In particular embodiments, the payment service system may facilitate users to invest in groups or packs of security assets. The payment service system may send, to a client device associated with a user, instructions to display one or more recommendations of packs of security assets. Each pack may comprise a plurality of security assets. The security assets for a particular pack may be identified based on one or more criteria such as industry, stage of growth, risk management, diversity, other suitable criteria, or any combination thereof. As illustrated in FIG. 4A, the payment service system may recommend a pack focused on stocks of companies developing or providing self-driving technology for autonomous vehicles. The user interface 400a may comprise a "Buy" button 411 linking to a user interface for buying this pack (e.g., user interface 400b shown in FIG. 4B) and a "Follow" button 412 for adding this pack of stocks to a followed list of the user. The user interface 400a may comprise a field 413 indicating a title of the pack of stocks, a field 414 showing a chart visualizing the fluctuation of the value of the pack, a field 415 showing price change data in numeric format, and a field 416 allowing the user to choose a period of time for showing the price change of the pack of stocks. The user interface 400a may also comprise a field 417 showing a list of six stocks that are included in the pack, which may include a list of the names of the related companies and any recent price changes associated with each of the stocks.

FIG. 4B illustrates a user interface 400b shown after the user interacts with the "Buy" button 411. The user interface 400b may comprise a pop-up section displaying information associated with the pack of stocks to be purchased (e.g., field 421 showing a name of the pack of stocks and field 422 showing the number of different stocks included in the pack) and one or more interactive elements allowing the user to configure a purchase order. For example, the pop-up section may comprise a field 423 showing a quantity of fiat currency to be used for the purchase, a slide bar 424 allowing the user to adjust the value of quantity 423, and a "Buy" button 425. In this example, if the user interacts with the "Buy" button 425, the user will purchase the Self-Driving pack using the specified quantity of fiat currency ($100). The specified quantity may comprise a fractional number of units of each of the stocks included in the Self-Driving pack. Here, the user may be allowed to set an arbitrary quantity of funds available to the user to invest in the pack of stocks. The payment service 108 may adjust the quantities of stock purchased to allow for fractional shares even if the stocks are generally sold in whole shares in public markets. This is enabled by the fact that the payment service 108 holds whole shares of the stocks while assigning ownership in fractional shares to the user.

Figure 4D:
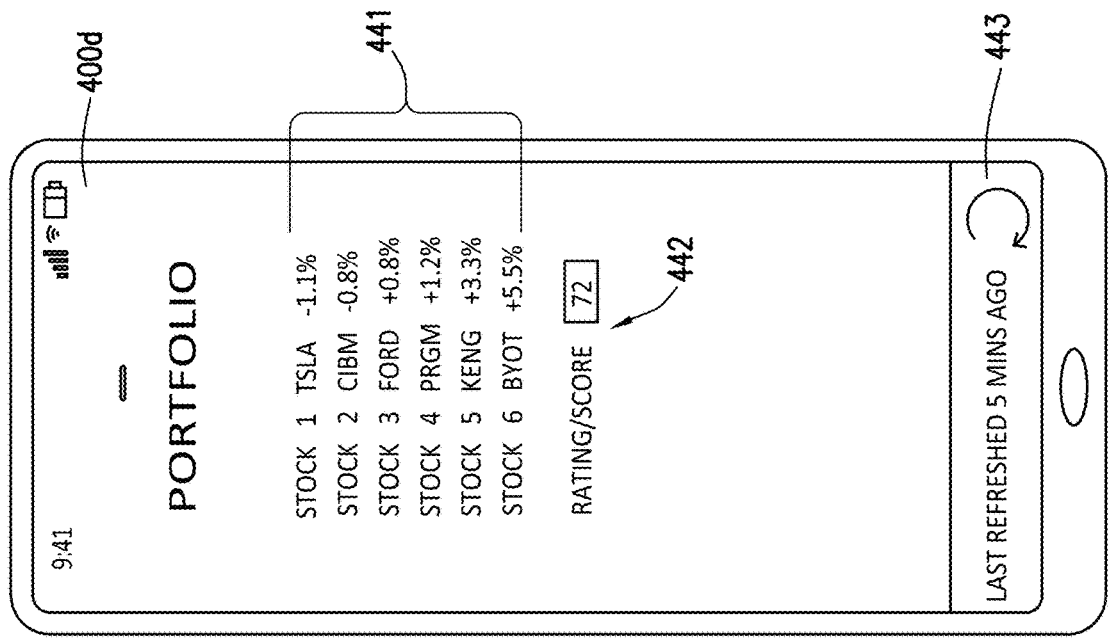
Figure 4C:
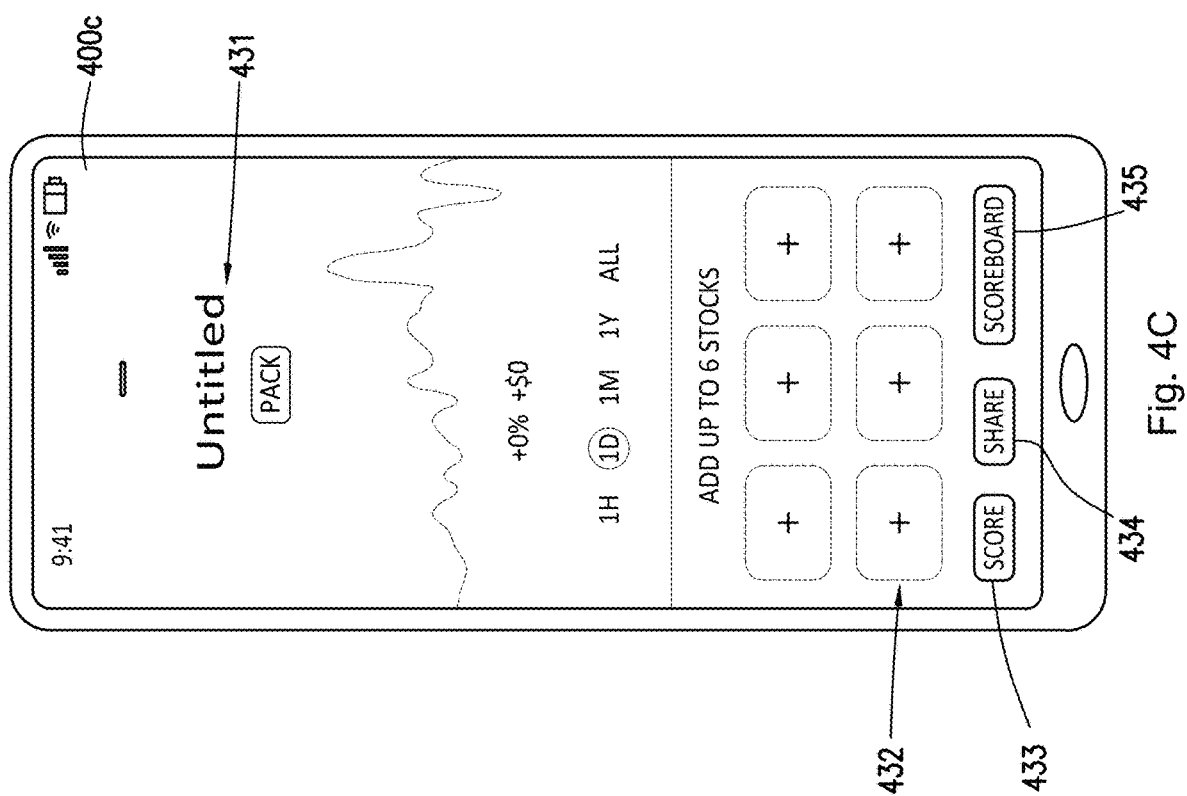

FIG. 4C illustrates a user interface 400c for creation of a pack of security assets. In particular embodiments, the payment service system may prompt a user to create a pack of security assets. The user may identify the assets to be included in the pack and the weight assigned to each of the assets. The user interface 400c may comprise a field 431 for the user to enter a name for the pack of security assets and a field 432 for the user to select up to six different security assets to add to the pack. The user interface 400c may comprise a "SCORE" button for accessing a score for the pack of security assets calculated by the payment service 108, a "SHARE" button for sharing the user's selection of the pack of security assets to one or more social contacts of the user, and a "SCOREBOARD" button to view a list of scores associated with one or more other users.

FIG. 4D illustrates an example user interface for displaying a summary of an investment portfolio of a user. The user interface illustrated by FIG. 4D may comprise a list of security assets (e.g., stocks). For each security asset, the user interface may comprise a name of the security asset, a ticker indicating the gain or loss of the security asset in a particular timeframe, other suitable information about the security asset, or any combination thereof. The user interface may also comprise a "RATING/SCORE" field showing a rating or score calculated for the portfolio by the payment service 108. The rating or score may be calculated based on an assessment of performance, risk level, diversity, other suitable criteria, or any combination thereof. The user interface may also comprise a field displaying a time of last refreshing of the information about the security assets and an interactive element corresponding to manually requesting refreshing the information. The user interface may also comprise one or more FIG. 4E illustrates an example user interface showing a scoreboard for investment portfolios of multiple users. The user interface may display a list of names and a score corresponding to each name. The listed users may comprise one or more social contacts of the viewing user or one or more other users. The sharing of information on the scoreboard may be subject to one or more privacy settings associated with each of the listed users. As an example and not by way of limitation, a user may specify that information about her portfolio may be shared with her contacts, one or more followers, or one or more other identified users. The scoreboard shown in this user interface may only display information about users who have given the viewing user permission to access their information.

FIG. 4F illustrates an example user interface allowing a user to manage an investment portfolio. The user interface may comprise a field displaying a list of goals that the user sets for her investment (e.g., profit margin, growth rate, risk level) and a field displaying one or more notifications associated with investing in security assets. The notifications may comprise one or more notifications pushed by the payment service 108 (e.g., news about particular security assets) or generated by one or more peer-to-peer contacts of the user (e.g., investment activities, discussion of investment strategy).

Figure 5:
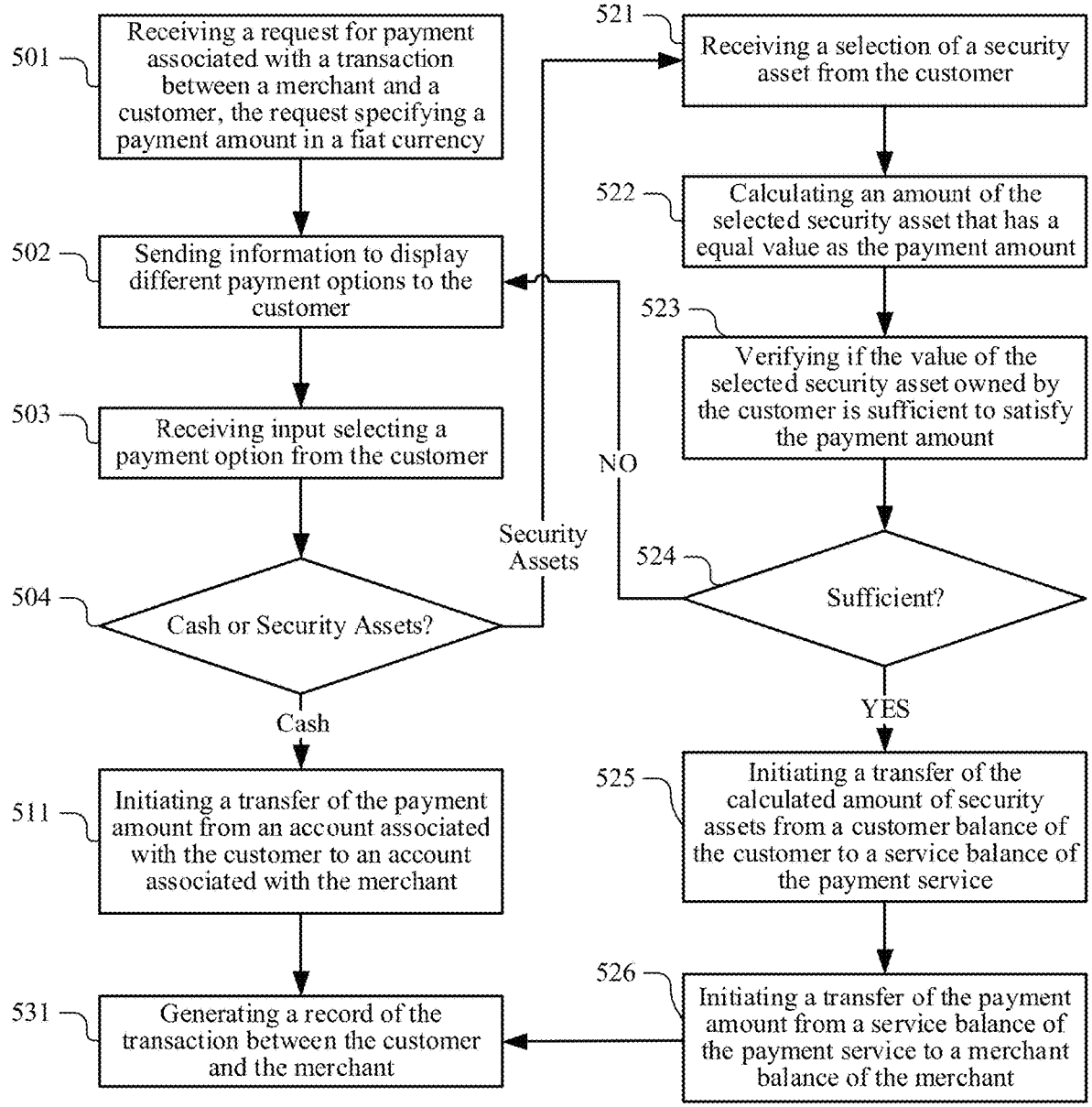
FIG. 5 illustrates an example method for settling a payment transaction between a customer and a merchant using security assets.

FIG. 5 illustrates an example method 500 for settling a payment transaction between a customer and a merchant using security assets. In particular embodiments, the payment service 108 may allow a customer to pay for a transaction with a merchant using security assets held by the payment service 108 and owned by the customer. The method 500 may being at step 501, where the payment service system may receive, from a point-of-sale system 105 associated with the merchant, a request for payment associated with the transaction. The request may specify a payment amount in a fiat currency. The request for payment may comprise a customer identifier corresponding to the customer and a merchant identifier corresponding to the merchant. The request for payment may be sent in response to a transaction occurred at a point-of-sale system 105 associated with the merchant. The customer may pay for the transaction using a physical card issued by the payment service 108 or a virtual card displayed by a mobile application associated with the payment service 108.

At step 502, the payment service 108 may send, to a computing device 103 associated with the customer, information to display the request for payment with different payment options. The different payment options may correspond to using different assets to pay for the transaction. The payment options may comprise an option to pay using cash managed by the payment service, an option to pay using a credit card or debit card issued by a third-party financial institution, an option to pay using a cryptocurrency, an option to pay using security assets owned by the customer, other suitable options, or any combination thereof. The security assets used to pay for the transaction may be held by the payment service 108 and assigned to the customer. The assignment may be documented in one or more ledgers associated with the customer stored by the payment service system 108.

At step 503, the payment service system 108 may receive an input selecting one of the payment options from the computing device 103 associated with the customer. Then, at step 504, the payment service system 108 may determine which option was selected by the customer. If the customer chooses to make the payment in cash, the payment service system 108 may proceed to step 511. If the customer chooses to make the payment using security assets, the payment service system 108 may proceed to step 521.

At step 511, the payment service 108 may initiate a transfer of the payment amount from an account associated with the customer to an account associated with the merchant. The accounts may both be financial accounts holding cash of a particular fiat currency. Each account may be managed by the payment service 108 or by a third-party financial institution. Then, at step 531, the payment service system 108 may generate a record of the transaction between the customer and the merchant.

At step 521, the payment service 108 may receive a selection of a security asset from the computing device 103 associated with the customer. After the customer chooses to pay for the transaction using security assets, the payment service system 108 may send, to the computing device 103 associated with the customer, information to display a list of security assets owned by the customer. The list of security assets may comprise, for example, stocks, bonds, stock options, futures contracts, exchange-tradable funds, notes, other suitable security assets, or any combination thereof. The payment service 108 may make one or more recommendations regarding which security asset to use to fulfil the payment (e.g., a last-purchased stock, stocks with the most gain/losses). The customer may provide an input selecting one of the security assets. The computing device 103 associated with the customer may then send such an input to the payment service system 108.

At step 522, the payment service system 108 may calculate a quantity of the selected security asset that has an equal value as the payment amount specified in the request for payment. The calculation may be based on a current price of the security asset with respect to a fiat currency acceptable by the merchant. The calculation may alternatively be based on an average price of the security asset within a predetermined time period.

At step 523, the payment service system 108 may verify if a value of the selected security asset held by the payment service and assigned to the customer is sufficient to satisfy the payment amount. The value may be calculated based on a real-time price of the security asset. At step 524, if the security asset owned by the customer is determined to be sufficient, the payment service system 108 may proceed to step 525. Otherwise, the payment service system may return to step 502 and provide options for the customer to select payment options or another security as set.

At step 525, the payment service system 108 may initiate a transfer of at least a portion of the value of the security asset from a customer balance of the customer to a service balance of the payment service. The portion of the value of the security asset may equal the amount of the selected security asset that is calculated at step 522. The customer balance and the service balance may each include a value of security asserts and a value of fiat currency and is stored in a data structure maintained by the payment service. The transfer of the security asset may be carried out by debiting a securities ledger 204 associated with the customer and crediting a securities ledger 214 associated with the payment service 108. Here, the amount of security asset transferred may comprise a fractional number of a base unit of the security asset. For example, if the security asset is a company's stock, it may compare a fraction of a share.

At step 526, the payment service system 108 may initiate a transfer of a value in the fiat currency from the service balance of the payment service to a merchant balance of the merchant. The merchant balance may be stored in the data structure maintained by the payment service. The payment service system 108 may automatically convert the amount of security asset received from the customer to a quantity of fiat currency and transfer the fiat currency to the merchant. The fiat currency may be transferred to the merchant by debiting the currency ledger 212 associated with the payment service 108 and crediting the currency ledger 208 associated with the merchant.

After completing the transfer of assets, the payment service system 108 may proceed to step 531 and generate a record of the transaction between the customer and the merchant. The record of the transaction may be stored by the payment service system 108 in one or more data stores associated with the payment service system 108 (e.g., transaction log 202 in the customer profile 132, transaction log 207 in the merchant profile 134). The payment service system may also generate and send one or more notifications or reports about the transaction. For example, the payment service system may send, to the point-of-sale system 105 associated with the merchant, a report associated with the record of the transaction. The report may specify the customer identifier and amount paid as the value in the fiat currency without disclosing that the payment was made in the security asset. The payment service system may also send, to the computing device 103 associated with the customer, a notification associated with the record, where the notification may specify the amount of security assets used to satisfy the payment.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for settling a payment transaction between a customer and a merchant using security assets including the particular steps of the method of FIG. 5, this disclosure contemplates any suitable method for settling a payment transaction between a customer and a merchant using security assets including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, the payment service system 108 may also provide a platform for a user to purchase security assets. The payment service system 108 may receive, from the computing device 103 associated with the customer, a purchase request to purchase a quantity of security asset. In response, the payment service system 108 may update a customer balance associated with the customer to increase the value of the security asset in a securities ledger 204 and to decrease a value of the fiat currency in a currency ledger 203 of the customer. The payment service system 108 may also update a service balance associated with the payment service 108 to decrease a value of the security asset in the securities ledger 214 and to increase a value of the fiat currency in the currency ledger 212.

In particular embodiments, the payment service system 108 may facilitate users to invest in groups or packs of security assets. The payment service system 108 may send, to a computing device 103 associated with a user, information to display a suggestion of a security pack to invest in. The security pack may comprise a plurality of different security assets, each corresponding to a weight. The payment service system 108 may receive, from the computing device 103 associated with the customer, a purchase request to purchase a quantity of the security pack. In response, the payment service system 108 may update the value of the fiat currency and a value of each of the plurality of security assets in the customer balance based on the amount of the security pack and the weight of each of the security assets. The payment service system 108 may also update the value of the fiat currency and a value of each of the plurality of security assets in the service balance based on the amount of the security pack and the weight of each of the security assets.

In particular embodiments, the payment service system 108 may provide a platform for users to invest in funds, tradeable assets, securities, or other assets. The assets may have varying risks, rewards, or maturity levels. The fund used for the investment may be drawn from one or more financial accounts associated with the user that is managed by the payment service system 108 or a third-party system. The payment service system 108 may receive user settings regarding an entire investment portfolio or one or more individual funds or investment accounts. For example, a user may set a level of risk tolerance on the entire portfolio or on a per-fund basis. The payment service system may recommend one or more packs of financial assets to the user. Alternatively, the user may pick and customize a pack of assets based on considerations such as the user's risk tolerance.

In particular embodiments, the payment service system 108 may use machine learning to make recommendations of asset packs to the user. For example, the payment service system 108 may collect data about other users who match a particular user's age, location, occupation, or other biographical characteristics. Given that people having similar biographical characteristics may have similar abilities to sustain risk or similar investment goals, the payment service system 108 may formulate recommendations for a particular user based on choices made by others determined to be similar. Collecting data from users who are investing in financial assets may be subject to one or more privacy settings associated with each user. The payment service system may only collect data from a particular user after permission is granted. The payment service system may anonymize the data before performing any analysis.

In particular embodiments, the payment service system 108 may gamify investment activities by providing one or more social features associated with investments. Upon permission by a user, the payment service system 108 may collect data about various metrics about investments made by the user (e.g., gains, losses, savings). The payment service system 108 may score the user's performance in terms of investment based on such metrics. A score for a user may be calculated based on a formula that takes into consider the various metrics. The score for a user may be compared with those of other users. For example, the payment service system 108 may allow users to create a scoreboard based on the investments made by a specific user. The payment service 108 or the users may set one or more rules for a particular scoring game. For example, each user may be required to invest in a particular number of assets or in assets of a particular type or nature. A user may be incentivized to make smarter investment decisions in order to beat another on the scoreboard. The decisions may include investing more or less in a portfolio, change the financial assets included in a pack, change the weight assigned to each of the assets.

As an example and not by way of limitation, the payment service system 108 may obtain information related to one or more investments by one or more customers of an investment platform and apply game points to each of the investments based on a gain or a loss value at that time. This may encourage competition among users to achieve better investment results. The payment service system 108 may then rank investment portfolios based on the game points earned. Each investment portfolio may comprise the one or more investments corresponding to a customer based on the game points. The payment service system 108 may allow a customer to exchange game points accrued for benefits. The benefits may comprise purchasing information pertaining to the investment portfolio based on the ranking, redeeming rewards or promotions, participating in a challenge and gain additional game points from the challenge if the user wins that challenge, or starting a challenge by inviting the user's friends in the platform and other social networks to stake their game points into the challenge, wherein the winner of the challenge gains all the game points staked by the participants of the challenge.

In particular embodiments, a user may authorize the payment service 108 to share information about the user's investment to a community of other users. The payment service 108 may provide the user options as to the other users to share the information with (e.g., friends, friends of friends, manually-identified users). The information shared may include, for example, the financial assets chosen by the sharing user. The information may be offered for free or for purchase depending on the choice of the sharing user. In particular, a user may maintain her selection of a number of security assets (e.g., six stocks or a "six pack") as "trade secret" or a "secret formula" and offer such secret information for sale to other users. The other users may pay a fee to the sharing user to access the information associated with the selection of the security assets. For a user willing to share her investment information for a fee, the payment service 108 may intelligently recommend a price for the user and dynamically adjust the price so as to ensure a broad reach of the secret formula. A user may request to add another user to be a "coach" based on information shared by the other user (e.g., information showing an excellent track record of investments). The other user, if accepts the request, may help the requesting user to plan investment strategy for compensation.

In particular embodiments, the payment service system 108 may offer various other tools to facilitate a user's investment activities. As an example and not by way of limitation, the payment service system 108 may send notifications to users when a certain mark is crossed or when a certain milestone is missed. The notification policy may be set by the user. A user may also set one or more types of alerts. Based on information it receives about security assets, the payment service 108 may deliver alerts or tips to a user to inform the user as to investment decisions.

In particular embodiments, the payment service system 108 may make smart recommendations based on transactions between a user with one or more other users or merchants. As an example and not by way of limitation, the payment service system 108 may recommend a particular investment that a user may make using money the user just received from another user. As another example and not by way of limitation, the payment service system 108 may recommend a user to release certain investments for use in future payments.

In particular embodiments, the payment service system 108 may dynamically adjust its holdings of security assets to control the amount of security assets owned by the payment service 108. In particular embodiments, the payment service system 108 may determine, for each of a plurality of security assets, a value of the security asset in the service balance. It may then calculate a risk index associated with each of the security assets based on the value of the security asset in the service balance. Based on the risk index, the payment service system 108 may initiate one or more transactions each comprising buying at least one of the security assets from or selling at least one of the security assets to a third-party source of security assets 145.

FIG. 7 illustrates an example system architecture for implementing one or more investment gamification features. As illustrated by FIG. 7, the system architecture may comprise a user interface 710, a real-time monitoring engine 720, a decision/ranking engine 730, a contacts/external API service 740, a machine learning/rules server 750, a gamification engine 760. The various components of the system may communicate with one another. For example, the real-time monitoring engine 720 may send real-time information to the user interface 710; the decision/ranking engine 730 may send information about a ranking of a portfolio to the user interface 710; the gamification engine 760 may send reward/recommendations information to the user interface 710. The gamification engine 760 may be associated with an API 765 allowing the user to share her investment information (stock picks) on one or more external platforms 740 (e.g., an external social network). The machine-learning/rules server 750 may provide backend support for the decision/ranking engine 730. The decision/ranking engine 730 may receive information about one or more contacts or external information from the contacts/external API service 740. In particular, relationships among users may be established using the payment service or be obtained from one or more third-party systems (e.g., an external social network, notification engine 770) by making one or more API 765 calls. One or more of the components may directly or indirectly receive one or more user inputs 780 in the user interface 710. The gamification engine 760 may comprise or be associated with an API 765 allowing sharing algorithms used for one or more gamification functionalities.

Figure 8A:
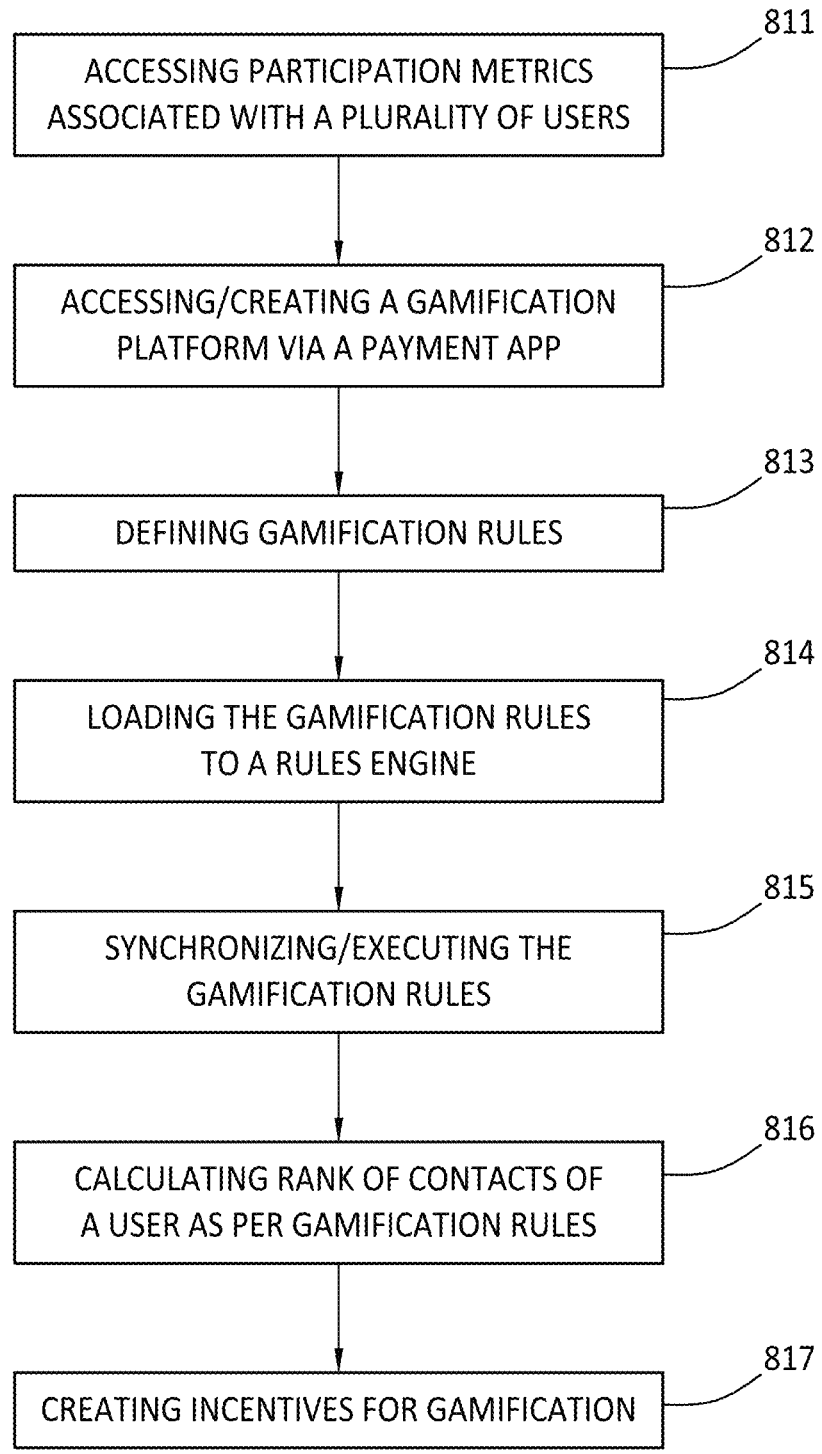
FIG. 8A illustrates an example method for creating a game associated with investment in security assets.

FIG. 8A illustrates an example method for creating a game associated with investment in security assets. The method may be executed by one or more servers associated with the payment service 108. The payment service 108 may first access (at block 811) participation metrics associated with a plurality of users (e.g., how many users invest in security assets through the payment service, the performance of investment portfolios of the users). The payment service 108 may then create (at block 812) a gamification platform. The gamification platform may be accessed via a payment application executing on a client device of a user. The payment service 108 may then define (at block 813) a plurality of gamification rules and load (at block 814) the gamification rules to a rules engine. The gamification rules may be tailored to the overall performance of a user base (e.g., higher standard for a bullish market). The payment service 108 may synchronize (at block 815) and execute the rules and calculate (at block 816) ranks for a particular user against the user's contacts based on the gamification rules. The payment service 108 may finally create (at block 817) and distribute one or more incentives to users based on their performance as judged based on the gamification rules. The incentives may comprise one or more rewards (e.g., a discount for a future purchase, game points).

Figure 8B:
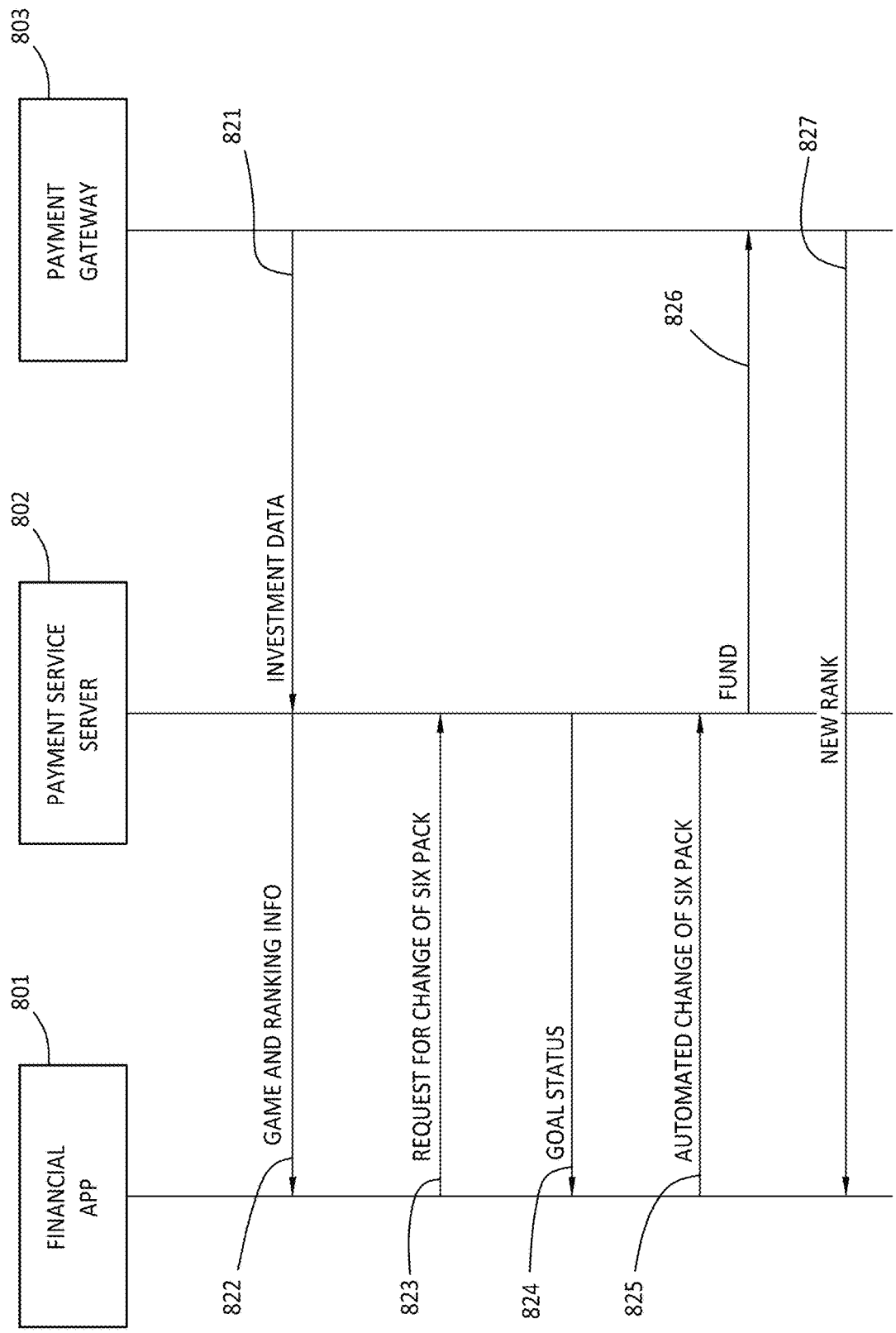
FIG. 8B illustrates an example process for facilitating change of selected security assets by a user.

FIG. 8B illustrates an example process for facilitating change of selected security assets by a user. The process may be performed by a financial application 801 executing on a client device of a user, a server 802 associated with the payment service 108, and a payment gateway 803 associated with payment service 108. The payment gateway 803 may allow the payment service 108 to exchange cash or security assets with one or more sources of security assets. The payment gateway may gather investment data 821 about one or more security assets and forward such data to the server 802 associated with the payment service 108. Based on the received data, the server 802 may calculate a rank for a user based on the user's investment portfolio and rules of a game 822 that the user participates in. The user may send a request 823 for change of an investment portfolio to the server 802 through the financial application 801. The server 802 may send a status 824 of one or more goals that the user has set and how well the goals are being accomplished. Based on the status of the goals of the user, the server 802 may send to the user one or more suggestions as to how to change 825 the current investment portfolio the user has (e.g., a particular six-pack). If the user accepts one of the suggestions by the payment service 108, the payment service 108 may automatically change the composition of an investment portfolio of the user. If purchasing or selling particular security assets is necessary, the payment service may send money 826 to the payment gateway 803. In return, the user will own a new portfolio of security assets and the server associated with the payment service 108 may calculate a new rank 827 for the user. This rank may be sent to the financial application for display.

Figure 6:
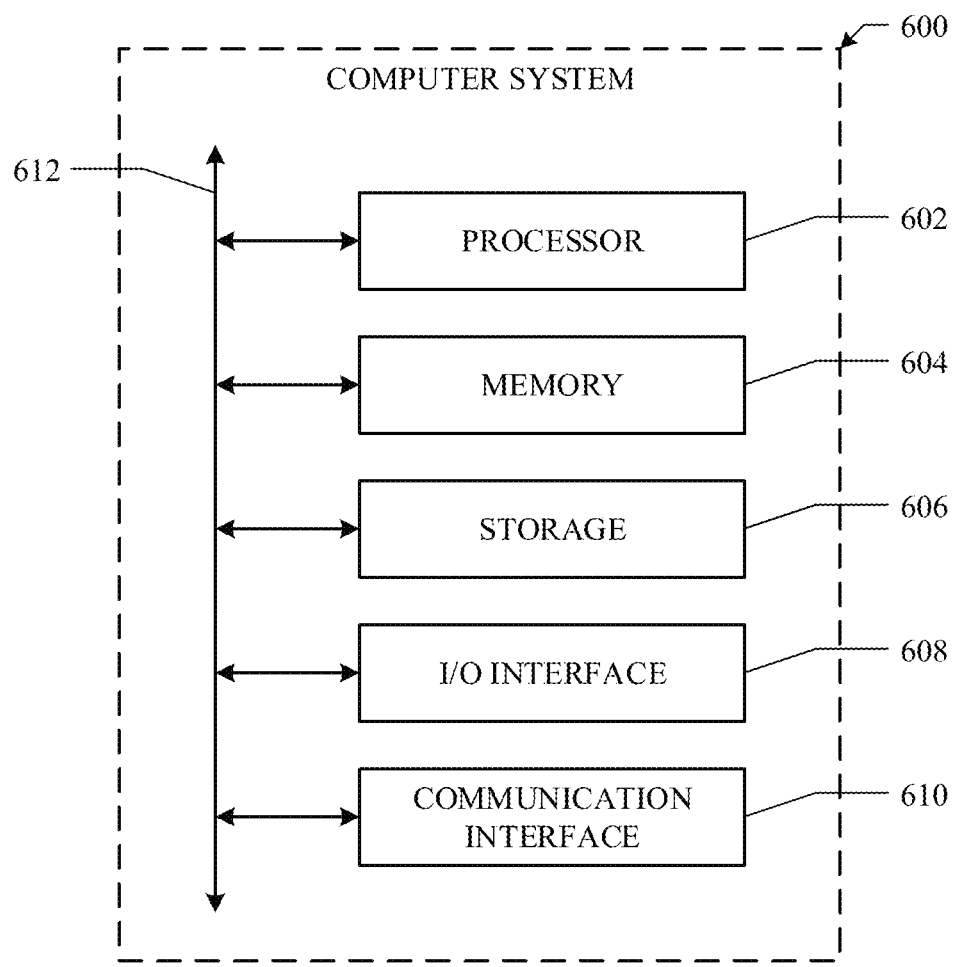
FIG. 6 illustrates an example computer system.

FIG. 6 illustrates an example computer system 600. The computer system 600 may be a computer system associated with the payment service 108, POS device 105, or customer device 103. While these devices may have components in common, such as those illustrated in FIG. 6, it should be appreciated that each of the payment service system 108, POS device 105, or customer device 103 may be specialized devices configured for their specific purposes. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As an example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A securities transaction system associated with a payment service, the securities transaction system comprising:
    a ledger storing securities balances recording a plurality of amounts of security assets respectively managed and recorded by the payment service on the securities transaction system on behalf of a plurality of users, the plurality of amounts of the security assets respectively owned by the plurality of users of the payment service, wherein the plurality of amounts of the security assets are each part of a quantity of the security assets that is purchased on behalf of the payment service from a securities exchange system that is external to the payment service and that is external to the ledger; and
    one or more processors for executing instructions stored in a computer-readable medium, the instructions being executable to:
        send, to a mobile wallet application associated with the payment service and executing on a device of a user of the payment service, information regarding one or more of the security assets managed by the payment service;
        generate, using a trained machine learning model and based on information regarding the user and the information regarding the one or more of the security assets managed by the payment service, a recommendation of a recommended security asset selected from the security assets managed by the payment service;
        receive, from the mobile wallet application, a purchase request from the user to acquire ownership over an amount of the recommended security asset of the security assets managed by the payment service;
        update the ledger to identify one or more updated securities balances that reflect that the amount of the recommended security asset of the security assets is owned by the user to fulfill the purchase request based on a value of the amount of the recommended security asset of the security assets associated with the purchase request, wherein the purchase request is fulfilled by assigning the amount of the recommended security asset of the security assets to the user from the quantity of the security assets without further interaction with the securities exchange system;
        initiate one or more transactions involving the securities exchange system to control a volume of at least one of the security assets managed and recorded by the payment service in the ledger for the at least one of the security assets; and
        confirm that the one or more transactions are processed.

2. The securities transaction system of claim 1, wherein the instructions are further executable to:
    calculate a risk index associated with at least one of the security assets owned by the user; and
    automatically initiate a transaction involving the at least one of the security assets owned by the user based at least in part on the risk index associated with the at least one of the security assets exceeding a threshold value.

3. The securities transaction system of claim 2, wherein the threshold value is set based on information associated with the user.

4. The securities transaction system of claim 1, wherein the instructions are further executable to:
    receive one or more goals set by the user and relating to one or more security assets owned by the user; and
    automatically initiate a transaction involving at least one of the security assets owned by the user based at least in part on the one or more goals set by the user.

5. The securities transaction system of claim 1, wherein the instructions are further executable to:
    receive one or more goals set by the user and relating to one or more security assets owned by the user;
    generate a recommended modification to one or more amounts of the one or more security assets owned by the user; and
    send the recommended modification to the mobile wallet application associated with the payment service and executing on the device of the user, wherein the purchase request from the user is based on the recommended modification.

6. The securities transaction system of claim 1, wherein the amount of the one of the security assets managed and recorded by the payment service associated with the purchase request includes a fractional number of a base unit of the recommended security asset of the security assets.

7. The securities transaction system of claim 1, wherein the one or more transactions involving the security asset from the securities exchange system are initiated automatically and in response to determining that the volume of the at least one of the security assets managed and recorded by the payment service is below a specified level associated with a projected demand.

8. The securities transaction system of claim 1, wherein, to update the ledger to identify one or more updated securities balances that reflect that the amount of the one of the security assets is owned by the user to fulfill the purchase request, the one or more processors are configured to:
    update, by the payment service, a securities balance recording an amount of at least one security asset owned by the user to increase the value of the at least one security asset owned by the user and to decrease a value of one or more other assets owned by the user to generate one of the one or more updated securities balances; and
    update, by the payment service, a securities balance recording an amount of the at least one security asset managed and recorded by the payment service to decrease the value of the at least one security asset and to increase the value of the one or more other assets managed and recorded by the payment service.

9. The securities transaction system of claim 1, wherein the one or more transactions involving the security asset from the securities exchange system include an aggregate transaction, and wherein the instructions are further executable to:
receive information associated with a plurality of transactions, the plurality of transactions each associated with one or more of the plurality of users, wherein each transaction of the plurality of transactions corresponds to a purchase request to acquire an amount of one or more of the quantity of security assets managed and recorded by the payment service according to the purchase request from the user;
update the ledger to identify the one or more updated securities balances to reflect amounts of security assets respectively managed and recorded by the payment service and owned by each of the one or more of the plurality of users, based on a value of the security assets associated with each transaction of the plurality of transactions; and
initiate the aggregate transaction involving security assets from the securities exchange system based on aggregating information associated with each transaction of the plurality of transactions.

10. The securities transaction system of claim 1, wherein controlling the volume of at least one of the security assets managed and recorded by the payment service in the ledger is based on a projected demand for the at least one security asset is based on an amount of asset purchase requests received over a period of time.

11. A method for facilitating security asset transactions by a payment service, the method comprising, by a securities transaction system:
assigning, by the payment service and in a ledger storing securities balances, a plurality of amounts of security assets respectively managed and recorded by the payment service on the securities transaction system on behalf of a plurality of users, the plurality of amounts of the security assets respectively owned by the plurality of users of the payment service, wherein the plurality of amounts of the security assets are each part of a quantity of the security assets that is purchased on behalf of the payment service from a securities exchange system that is external to the payment service and that is external to the ledger;
sending, by the payment service and to a mobile wallet application associated with the payment service and executing on a device of a user of the payment service, information regarding one or more of the security assets managed by the payment service;
generating, by the payment service and using a trained machine learning model and based on information regarding the user and the information regarding the one or more of the security assets managed by the payment service, a recommendation of a recommended security asset selected from the security assets managed by the payment service;
receiving, by the payment service and from the mobile wallet application, a purchase request from the user to acquire ownership over an amount of the recommended security asset of the security assets managed by the payment service;
updating, by the payment service, the ledger to identify one or more updated securities balances that reflect that the amount of the recommended security asset of the security assets is owned by the user to fulfill the purchase request based on a value of the amount of the recommended security asset of the security assets associated with the purchase request, wherein the purchase request is fulfilled by assigning the amount of the recommended security asset of the security assets to the user from the quantity of the security assets without further interaction with the securities exchange system;
initiating, by the payment service, one or more transactions involving the securities exchange system to control a volume of at least one of the security assets managed and recorded by the payment service in the ledger for the at least one of the security assets; and
confirming, by the payment service, that the one or more transactions are processed.

12. The method of claim 11, further comprising:
calculating, by the payment service, a risk index associated with at least one of the security assets owned by the user; and
automatically initiating, by the securities transaction system, a transaction involving the at least one of the security assets owned by the user based at least in part on the risk index associated with the at least one of the security assets exceeding a threshold value.

13. The method of claim 12, wherein the threshold value is set based on information associated with the user.

14. The method of claim 11, further comprising:
receiving, by the securities transaction system, one or more goals set by the user and relating to one or more security assets owned by the user; and
automatically initiating, by the securities transaction system, a transaction involving at least one of the security assets owned by the user based at least in part on the one or more goals set by the user.

15. The method of claim 11, further comprising:
receiving, by the securities transaction system, one or more goals set by the user and relating to one or more security assets owned by the user;
generating, by the securities transaction system, a recommended modification to one or more amounts of the one or more security assets owned by the user; and
sending, by the securities transaction system, the recommended modification to the mobile wallet application associated with the payment service and executing on the device of the user, wherein the purchase request from the user is based on the recommended modification.

16. One or more computer-readable non-transitory storage media of a securities transaction system associated with a payment service, embodying software that is operable when executed using at least one processor to:
assign, by the payment service and in a ledger storing securities balances, a plurality of amounts of security assets respectively managed and recorded by the payment service on the securities transaction system on behalf of a plurality of users, the plurality of amounts of the security assets respectively owned by the plurality of users of the payment service, wherein the plurality of amounts of the security assets are each part of a quantity of the security assets that is purchased on behalf of the payment service from a securities exchange system that is external to the payment service and that is external to the ledger;
send, by the payment service and to a mobile wallet application associated with the payment service and executing on a device of a user of the payment service, information regarding one or more of the security assets managed by the payment service;

generate, using a trained machine learning model and based on information regarding the user and the information regarding the one or more of the security assets managed by the payment service, a recommendation of a recommended security asset selected from the security assets managed by the payment service;

receive, by the payment service and from the mobile wallet application, a purchase request from the user to acquire ownership over an amount of the recommended security asset of the security assets managed by the payment service;

update, by the payment service, the ledger to identify one or more updated securities balances that reflect that the amount of the recommended security asset of the security assets is owned by the user to fulfill the purchase request based on a value of the amount of the recommended security asset of the security assets associated with the purchase request, wherein the purchase request is fulfilled by assigning the amount of the recommended security asset of the security assets to the user from the quantity of the security assets without further interaction with the securities exchange system;

initiate, by the payment service, one or more transaction involving the securities exchange system to control a volume of at least one of the security assets managed and recorded by the payment service in the ledger for the at least one of the security assets; and confirm that the one or more transactions are processed.

17. The one or more computer-readable non-transitory storage media of claim 16, wherein the software is further is further operable when executed to:

calculate a risk index associated with at least one of the security assets owned by the user; and automatically initiate a transaction involving the at least one of the security assets owned by the user based at least in part on the risk index associated with the at least one of the security assets exceeding a threshold value.

18. The one or more computer-readable non-transitory storage media of claim 17, wherein the threshold value is set based on information associated with the user.

19. The one or more computer-readable non-transitory storage media of claim 16, wherein the software is further is further operable when executed to:

receive one or more goals set by the user and relating to one or more security assets owned by the user; and automatically initiate a transaction involving at least one of the security assets owned by the user based at least in part on the one or more goals set by the user.

20. The one or more computer-readable non-transitory storage media of claim 16, wherein the software is further is further operable when executed to:

receive one or more goals set by the user and relating to one or more security assets owned by the user;

generate a recommended modification to one or more amounts of the one or more security assets owned by the user; and send the recommended modification to the mobile wallet application associated with the payment service and executing on the device of the user, wherein the purchase request from the user is based on the recommended modification.

* * * * *